(12) United States Patent
Noda et al.

(10) Patent No.: US 9,393,691 B2
(45) Date of Patent: Jul. 19, 2016

(54) INDUSTRIAL ROBOT SYSTEM INCLUDING ACTION PLANNING CIRCUITRY FOR TEMPORARY HALTS

(75) Inventors: Akio Noda, Tokyo (JP); Haruhisa Okuda, Tokyo (JP); Kenichi Tanaka, Tokyo (JP); Tetsuo Sawaragi, Kyoto (JP); Hiroshi Matsuhisa, Kyoto (JP); Yasuyoshi Yokokouji, Kyoto (JP); Hideo Utsuno, Kyoto (JP); Masaharu Komori, Kyoto (JP); Hajime Mizuyama, Kyoto (JP); Hiroaki Nakanishi, Kyoto (JP); Yukio Horiguchi, Kyoto (JP); Takehisa Kouda, Kyoto (JP); Kazuhiro Izui, Kyoto (JP)

(73) Assignees: MITSUBISHI ELECTRIC CORPORATION, Tokyo (JP); KYOTO UNIVERSITY, Kyoto-shi (JP)

( * ) Notice: Subject to any disclaimer, the term of this patent is extended or adjusted under 35 U.S.C. 154(b) by 735 days.

(21) Appl. No.: 13/147,415

(22) PCT Filed: Feb. 10, 2010

(86) PCT No.: PCT/JP2010/051962
§ 371 (c)(1),
(2), (4) Date: Aug. 10, 2011

(87) PCT Pub. No.: WO2010/092981
PCT Pub. Date: Aug. 19, 2010

(65) Prior Publication Data
US 2011/0288667 A1     Nov. 24, 2011

(30) Foreign Application Priority Data

Feb. 12, 2009   (JP) ................. 2009-029374

(51) Int. Cl.
*B25J 9/06*   (2006.01)
*B25J 9/16*   (2006.01)
*G05B 19/42*  (2006.01)

(52) U.S. Cl.
CPC ............... *B25J 9/1661* (2013.01); *G05B 19/42* (2013.01); *G05B 2219/36404* (2013.01); *G05B 2219/39527* (2013.01); *G05B 2219/40111* (2013.01); *G05B 2219/40613* (2013.01)

(58) Field of Classification Search
CPC ..................... B25J 9/1661; G05B 2219/36404
USPC ................................................. 700/98, 23, 26
See application file for complete search history.

(56) References Cited

U.S. PATENT DOCUMENTS

| 5,301,103 A | 4/1994 | Sakamoto et al. |
| 5,825,655 A | 10/1998 | Nakagawa et al. |

(Continued)

FOREIGN PATENT DOCUMENTS

| DE | 695 04 998 T2 | 4/1999 |
| DE | 60 2004 013 107 T2 | 7/2009 |

(Continued)

OTHER PUBLICATIONS

Baydar et al., "Off-line error prediction, diagnosis and recovery using virtual assembly systems" Journal of Intelligent Manufacturing, 2004 pp. 679-692.*

(Continued)

*Primary Examiner* — Mohammad Ali
*Assistant Examiner* — Emilio J Saavedra
(74) *Attorney, Agent, or Firm* — Oblon, McClelland, Maier & Neustadt, L.L.P

(57) ABSTRACT

An industrial robot system may enable a reduction in an installation/adjustment period, and an increase in a no-error continuous operation period. The system includes an action planning section for temporary halts, an error-inducing-task restraining section, a section for teaching task, an operation mastering section, a hand library, an optimum-task-operation generating section, a specific task library, an error-recovery-task teaching section, an error recovery library, a finger-eye-camera measurement section including an omnidirectional mirror, a three-dimensional recognition section, a controller, a manipulator, and a hand with a plurality of fingers.

9 Claims, 17 Drawing Sheets

CONCEPTUAL DIAGRAM OF FINGER EYE CAMERA

(56) References Cited

U.S. PATENT DOCUMENTS

| | | | |
|---|---|---|---|
| 6,445,964 B1* | 9/2002 | White et al. | 700/61 |
| 2006/0009878 A1* | 1/2006 | Kobayashi et al. | 700/245 |
| 2006/0229766 A1 | 10/2006 | Setsuda | |
| 2008/0300723 A1* | 12/2008 | Ban et al. | 700/259 |

FOREIGN PATENT DOCUMENTS

| | | |
|---|---|---|
| EP | 1 701 824 | 7/2011 |
| JP | 03 116304 | 5/1991 |
| JP | 05 077142 | 3/1993 |
| JP | 06 190692 | 7/1994 |
| JP | 08 047880 | 2/1996 |
| JP | 2006 12074 | 1/2006 |
| JP | 2007 515305 | 6/2007 |

OTHER PUBLICATIONS

Yoshikawa et al., "Shape Recognition and Grasping by Robotic Hands with Soft Fingers and Omnidirectional Camera" ICRA 2008. IEEE International Conference on Robotics and Automation, 2008. ICRA 2008 May 19-23, 2008 pp. 299-304.*

Jardon et al., "ASIBOT assistive robot in a domestic environment" Proceeding PETRA '09 Proceedings of the 2nd International Conference on PErvasive Technologies Related to Assistive Environments, Article No. 61 Jun. 2009 4 pgs.*

International Search Report issued May 25, 2010 in PCT/JP10/051962 filed Feb. 10, 2010.

Office Action issued Oct. 10, 2014, in German Patent Application No. 11 2010 000 775.6 (with English translation).

* cited by examiner

Fig. 2  OVERVIEW OF ECOLOGICAL INTERFACE

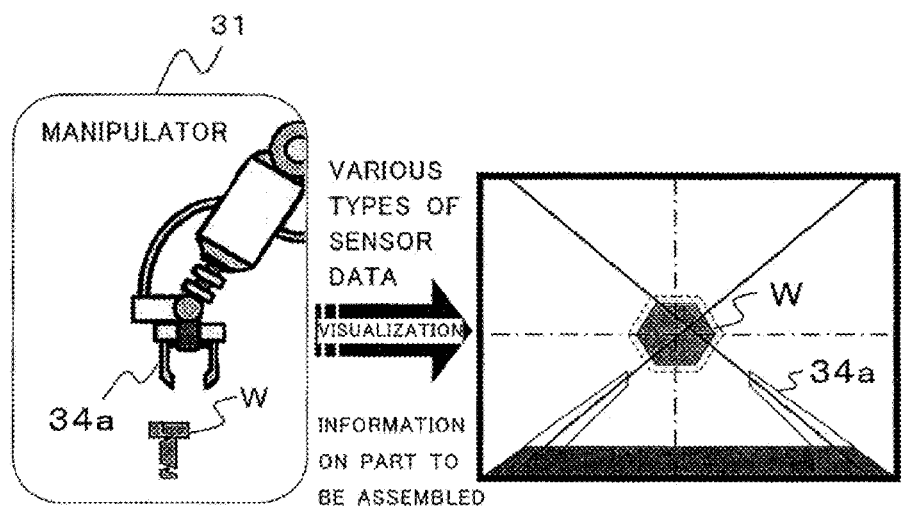

Fig. 3
INPUT/OUTPUT TO/FROM SECTION FOR TEACHING TASK

| INPUT | WORK SEQUENCE DIAGRAM INCLUDING ERROR RECOVERY SEQUENCE, WORK PATHS INCLUDING APPROXIMATE COORDINATES, VARIOUS TYPES OF SENSOR DATA, AND INFORMATION ON PART TO BE ASSEMBLED |
|---|---|
| OUTPUT | REFINED WORK PATHS (START POINT COORDINATE, END POINT COORDINATE, AND RANGES AND RESOLUTIONS OF COORDINATES OF PLURALITY OF VIA POINTS OF WORK PATH) |

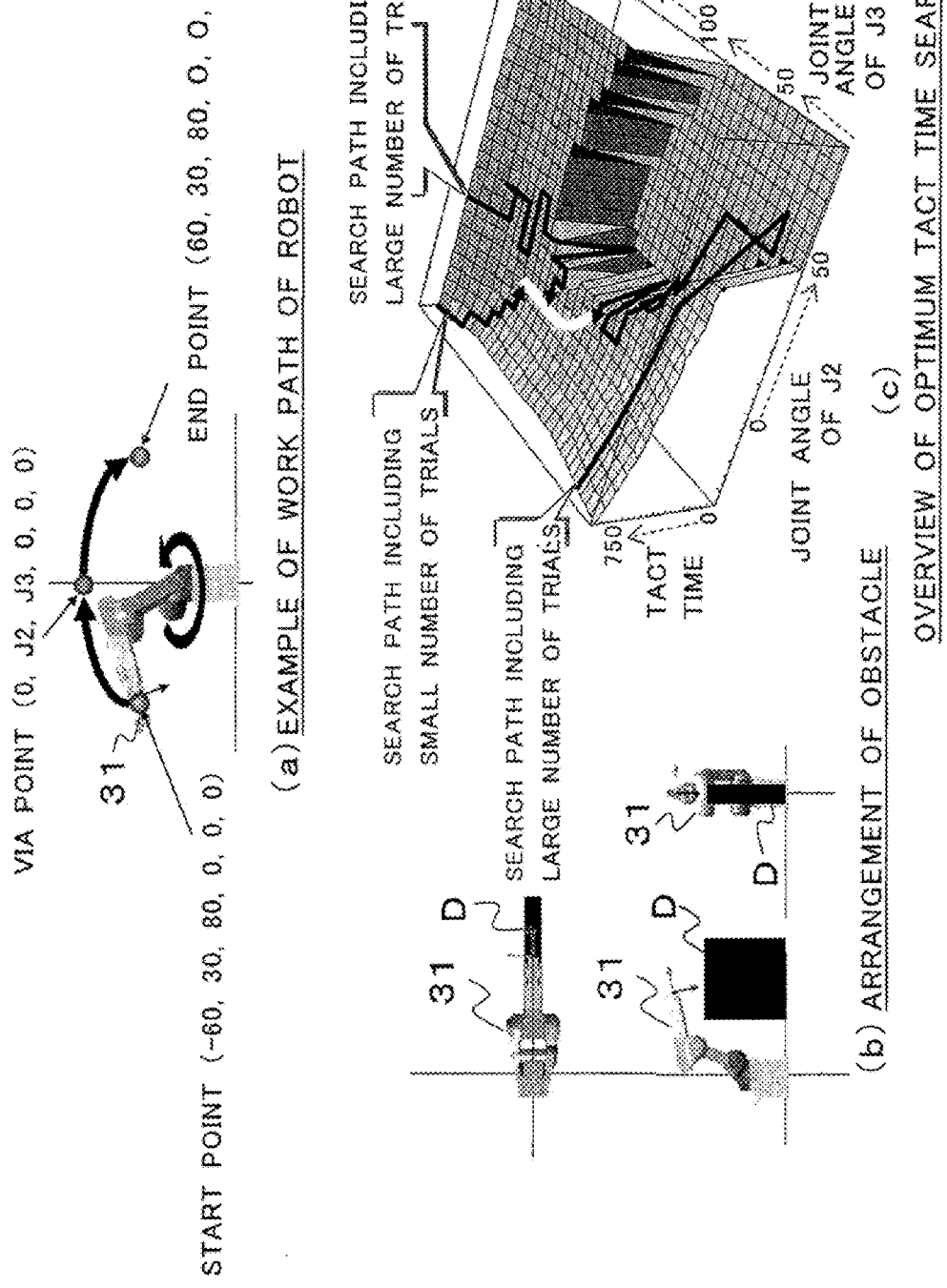

Fig. 5

| INPUT/OUTPUT TO/FROM OPERATION MASTERING SECTION | |
|---|---|
| INPUT | START POINT COORDINATE AND END POINT COORDINATE OF WORK PATH, RANGE AND RESOLUTION OF PLURALITY OF VIA POINT COORDINATES, TASK ENVIRONMENT INFORMATION, AND ROBOT INFORMATION |
| OUTPUT | •START POINT COORDINATE, END POINT COORDINATE, AND PLURALITY OF VIA POINT COORDINATES OF WORK PATH TRAJECTORY FROM START POINT TO END POINT TO PLURALITY OF VIA POINTS, AND ACCELERATION/DECELERATION INSTRUCTIONS |

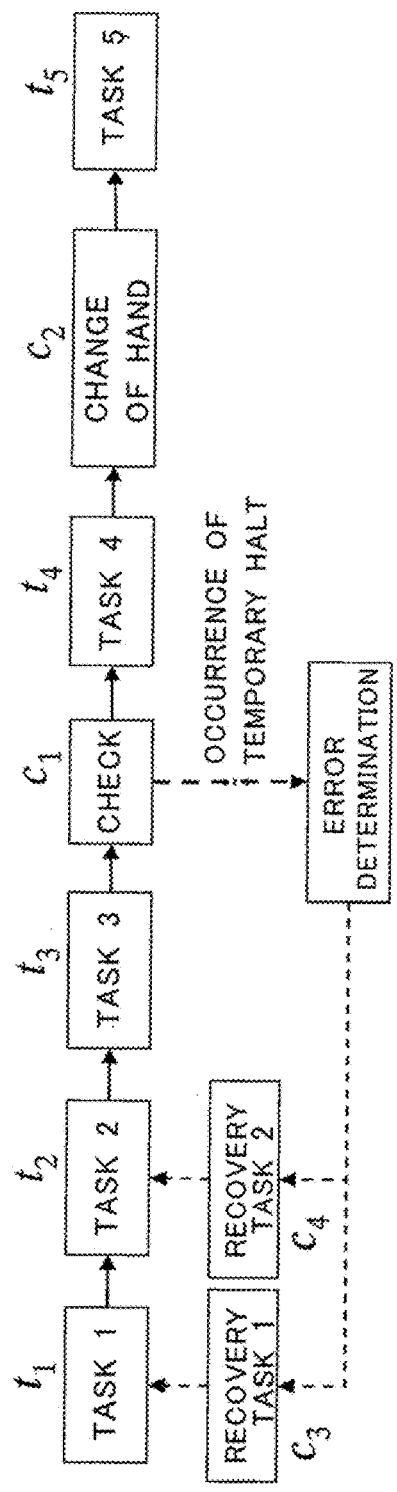
Fig. 6 TASK ANALYSIS CONSIDERING SUPPLEMENTARY TASKS SUCH AS RECOVERY FROM TEMPORARY HALT

Fig. 7

INPUT/OUTPUT TO/FROM ACTION PLANNING SECTION FOR TEMPORARY HALTS

| INPUT | THREE-DIMENSIONAL GEOMETRIC INFORMATION OF PART CONNECTION INFORMATION AND GEOMETRIC SHAPE DATA OF PRODUCT AND FACILITY LAYOUT DATA, ERROR OCCURRENCE PROBABILITY INFORMATION FOR CANDIDATES OF TASK ORDER, AND TEMPLATES OF WORK PATH |
|---|---|
| OUTPUT | TASK ORDERS INCLUDING SUPPLEMENTARY TASKS, APPROXIMATE WORK PATHS, POINTS REQUIRING TEACHING TASK, RECOVERY PROCEDURES, RECOVERY POINTS, AND SYNCHRONIZATION POINTS UPON ERROR OCCURRENCE, AND PART SURFACES WHICH ROBOT CAN GRIP |

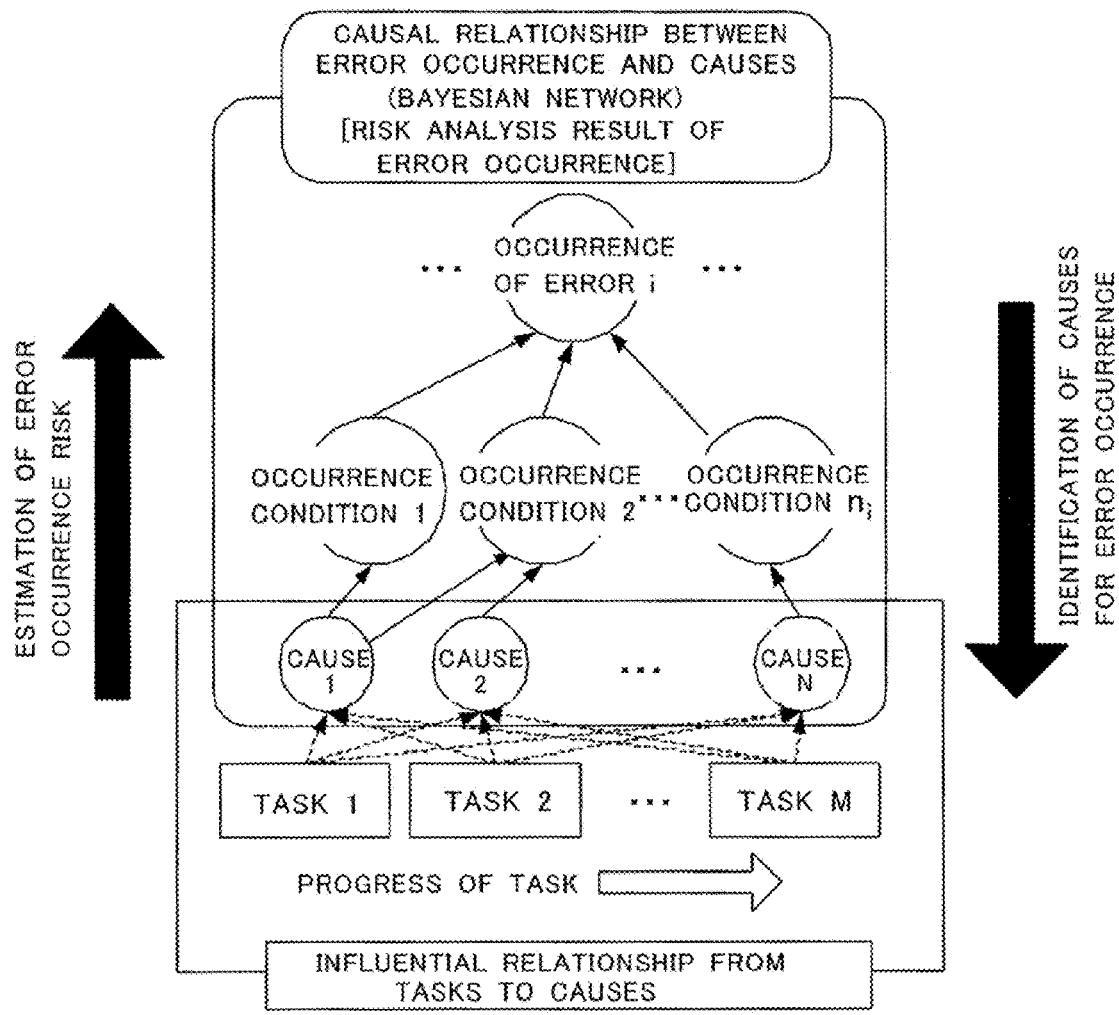
Fig. 8 FRAMEWORK OF ERROR OCCURRENCE RISK ANALYSIS METHOD

Fig. 9
INPUT/OUTPUT TO/FROM ERROR-INDUCING-TASK RESTRAINING SECTION

| INPUT | WORK SEQUENCE DIAGRAM ILLUSTRATING TASK ORDER, WORK SEQUENCE DIAGRAM INCLUDING ERROR RECOVERY SEQUENCE, INFORMATION SUCH AS BASIC DESIGN SPECIFICATIONS OF FACILITIES AND ROBOTS, AND TEACHING DATA BY OPERATOR |
|---|---|
| OUTPUT | TRANSITION INFORMATION ON ERROR OCCURRENCE PROBABILITY BASED ON TASK ORDER, ESTIMATED RESULT/WARNING OF ERROR OCCURRENCE PROBABILITY, AND INFORMATION ON CAUSES/COUNTERMEASURES FOR ERROR OCCURRENCE |

Fig. 10
INPUT/OUTPUT TO/FROM OPTIMUM-TASK-OPERATION GENERATING SECTION

| INPUT | TYPE OF SPECIFIC TASK (SUCH AS PEG-IN-HOLE), DESIGN INFORMATION (SUCH AS DIMENSION AND SHAPE) OF PART/WORKPIECE, MAJOR ERRORS TO BE CONSIDERED AND DISTRIBUTIONS THEREOF, GRIPPING ATTITUDES OF PART (GENERALLY, PLURALITY OF POSSIBLE CANDIDATES ARE GIVEN), ROBOT INFORMATION (SUCH AS POSSIBLE ELEMENT OPERATIONS AND CONTROL LAWS), AND AVAILABLE SENSOR INFORMATION |
|---|---|
| OUTPUT | TEMPLATES FOR WORK PATH INCLUDING CONDITIONAL BRANCHES (RESPECTIVELY OUTPUT FOR PLURALITY OF CANDIDATES OF GRIPPING ATTITUDE), VIA POINTS ON WORK PATH TEMPLATES, AND IMPLICATION THEREOF TO ELEMENT WORK SEQUENCES |

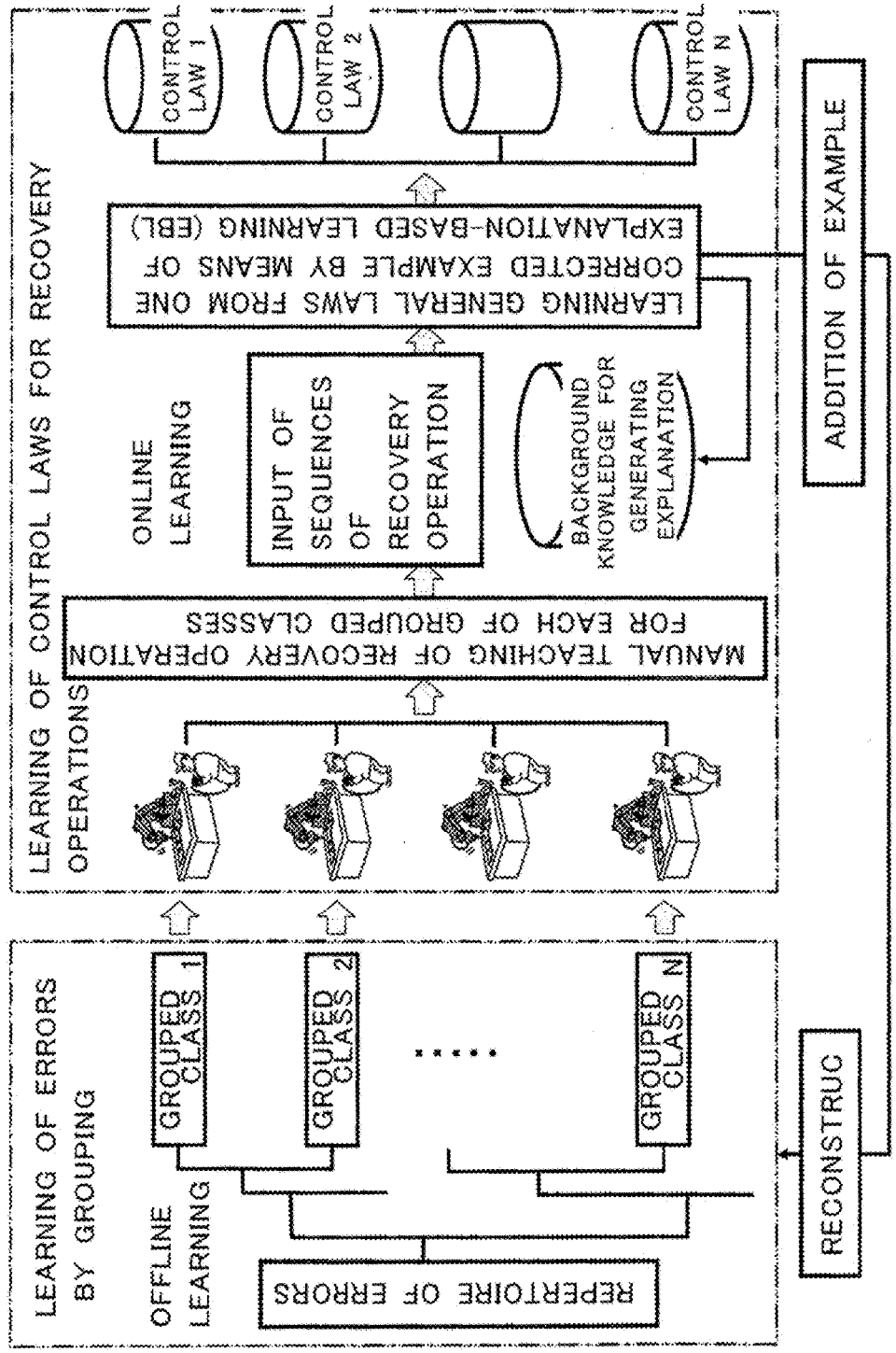
Fig. 11 SUPERVISED LEARNING SYSTEM BASED ON DEDUCTIVE LEARNING OF KNOWLEDGE

Fig. 12

INPUT/OUTPUT TO/FROM ERROR-RECOVERY-TASK TEACHING SECTION

| INPUT | CAUSE OF EACH ERROR OCCURRENCE, ROBOT OPERATION SEQUENCE UPON EACH ERROR OCCURRENCE, AND RECOVERY OPERATION HISTORY BY OPERATOR FOR EACH ERROR |
|---|---|
| OUTPUT | GENERAL RECOVERY WORK PATH AND RECOVERY OPERATION SEQUENCE FOR GROUPED ERROR STATE |

Fig. 13  CONCEPTUAL DIAGRAM OF FINGER EYE CAMERA

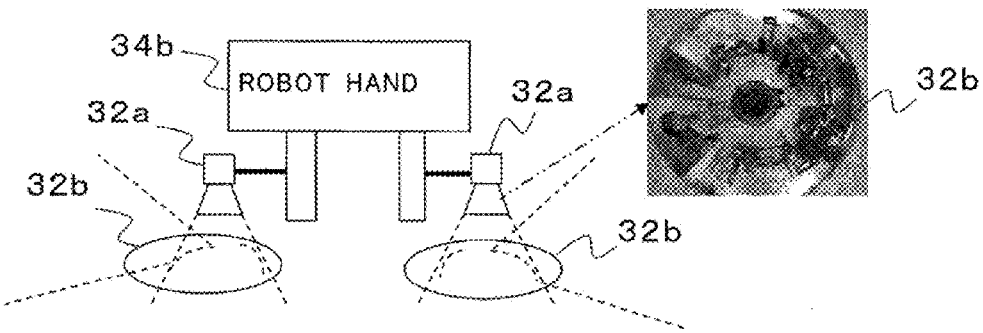

Fig. 14  INPUT/OUTPUT TO/FROM SENSOR FEEDBACK FUNCTION BASED ON FINGER-EYE-CAMERA MEASUREMENT SECTION

| INPUT | CAMERA IMAGE, NEAR DISTANCE DATA, REFERENCE MODEL DATA, END POINT MODEL DATA, AND CALIBRATION DATA (INTERNAL, EXTERNAL) |
|---|---|
| OUTPUT | TARGET DEVIATION DATA |

Fig. 15

INPUT/OUTPUT TO/FROM GRIPPING POSITION/ATTITUDE MEASUREMENT FUNCTION BASED ON FINGER-EYE-CAMERA MEASUREMENT SECTION

| INPUT | CAMERA IMAGE, REFERENCE MODEL DATA, AND CALIBRATION DATA (INTERNAL, EXTERNAL) |
|---|---|
| OUTPUT | POSITION/ATTITUDE DATA OF INTENDED OBJECT |

Fig. 16

EXAMPLE OF THREE-DIMENSIONAL MEASUREMENT/RECOGNITION PROCESSING

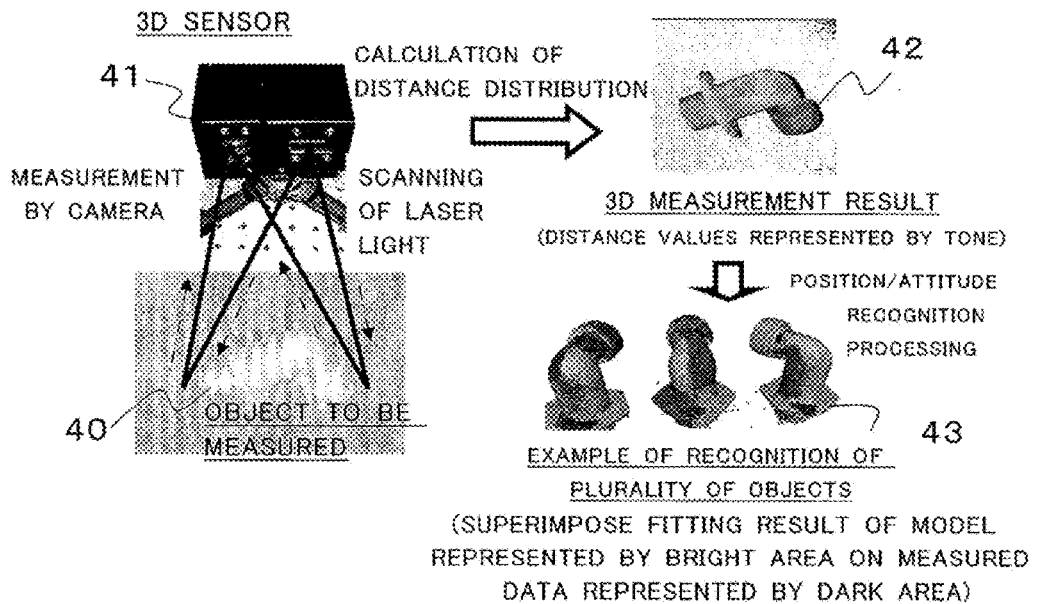

Fig. 17

INPUT/OUTPUT TO/FROM THREE-DIMENSIONAL RECOGNITION SECTION

| INPUT | DISTANCE DISTRIBUTION DATA, CAMERA IMAGE, REFERENCE MODEL DATA, AND CALIBRATION DATA (INTERNAL, EXTERNAL) |
|---|---|
| OUTPUT | POSITION/ATTITUDE DATA OF INTENDED OBJECT |

Fig. 18

INPUT/OUTPUT TO/FROM ALGORITHM DESIGN SUPPORT SECTION:
IMAGE MEASUREMENT/RECOGNITION SECTION

| INPUT | SURFACE CHARACTERISTIC DATA, THREE-DIMENSIONAL SHAPE DATA OF INTENDED OBJECT, CAMERA IMAGE, AND CALIBRATION DATA (INTERNAL, EXTERNAL) |
|---|---|
| OUTPUT | SUCCESS/FAILURE OF RECOGNITION AND ALGORITHM DESIGN PLAN |

Fig. 21

INPUT/OUTPUT TO/FROM HAND LIBRARY FUNCTION OF OFFLINE TEACHING SECTION

| INPUT | PART SHAPE |
|---|---|
| OUTPUT | GRIPPING POSSIBILITY, AND GRIPPING POSITION/ATTITUDE VALUES |

Fig. 22  INPUT/OUTPUT TO/FROM ERROR DETECTION FUNCTION OF OFFLINE TEACHING SECTION

| INPUT | VARIOUS TYPES OF SENSOR INFORMATION (ROBOT POSITION, TIME LIMIT, JOINT TORQUE, FORCE SENSOR OUTPUT VALUE, AND IMAGE SENSOR OUTPUT VALUE) |
|---|---|
| OUTPUT | TASK ERROR DETECTION LOGIC |

Fig. 23

INPUT/OUTPUT TO/FROM RECOVERY-LEVEL DETERMINATION FUNCTION OF OFFLINE TEACHING SECTION

| INPUT | WORK SEQUENCE DIAGRAM ILLUSTRATING TASK ORDER |
|---|---|
| OUTPUT | WORK SEQUENCE DIAGRAM IN WHICH CHECK POINTS FOR DETERMINING ERROR LEVEL AND FOR RECOVERY USED UPON ERROR RECOVERY HAVE ALREADY BEEN EMBEDDED |

Fig. 24

INPUT/OUTPUT TO/FROM ERROR-OCCURRENCE-RISK ANALYSIS FUNCTION OF OFFLINE TEACHING SECTION

| INPUT | WORK SEQUENCE DIAGRAM ILLUSTRATING TASK ORDER, WORK SEQUENCE DIAGRAM INCLUDING ERROR RECOVERY SEQUENCE, INFORMATION SUCH AS BASIC DESIGN SPECIFICATIONS OF FACILITIES AND ROBOTS, AND TEACHING DATA BY OPERATOR |
|---|---|
| OUTPUT | TRANSITION INFORMATION ON ERROR OCCURRENCE PROBABILITY BASED ON TASK ORDER, ESTIMATED RESULT/WARNING OF ERROR OCCURRENCE PROBABILITY, AND INFORMATION ON CAUSES/COUNTERMEASURES FOR ERROR OCCURRENCE |

Fig. 25
INPUT/OUTPUT TO/FROM ACTION CONTROL FUNCTION OF ERROR RECOVERY SECTION

| INPUT | WORK SEQUENCE DIAGRAM AND DEGREE OF ERROR SERIOUSNESS |
|---|---|
| OUTPUT | ERROR RECOVERY OPERATION MODE |

Fig. 26
INPUT TO/OUTPUT FROM FUNCTION OF ENHANCING SECTION FOR TEACHING TASK OF ERROR RECOVERY SECTION

| INPUT | VARIOUS TYPES OF SENSOR INFORMATION (ROBOT POSITION, TIME LIMIT, JOINT TORQUE, FORCE SENSOR OUTPUT VALUE, AND IMAGE SENSOR OUTPUT VALUE), WORK PATH, AND OPERATED QUANTITY BY OPERATOR |
|---|---|
| OUTPUT | IMAGE DISPLAYING COMBINED INFORMATION |

Fig. 27
INPUT/OUTPUT TO/FROM TELEOPERATION FUNCTION OF ERROR RECOVERY SECTION

| INPUT | OPERATED QUANTITY OF OPERATOR |
|---|---|
| OUTPUT | SIMPLIFIED-SENSE-FEEDBACK-CONTROL OPERATED QUANTITY |

Fig. 28
INPUT/OUTPUT TO/FROM OBJECT RECOGNITION FUNCTION FOR PART PICKING OF RECOGNITION SECTION

| INPUT | SENSOR OUTPUT DATA, PARAMETERS, AND MODEL INFORMATION |
|---|---|
| OUTPUT | RECOGNITION RESULT FOR OBJECT PICKING FROM PART BOX, INTERFERENCE CHECK RESULT, AND POSITION CORRECTION VALUE OF GRIPPED OBJECT |

Fig. 29
INPUT/OUTPUT TO/FROM HYBRID VISION CORRECTION FUNCTION OF RECOGNITION SECTION

| INPUT | SENSOR OUTPUT DATA, RELATIVE POSITIONING INSTRUCTION IN TWO-DIMENSIONAL IMAGE, AND THREE-DIMENSIONAL POSITION/ATTITUDE VALUES |
|---|---|
| OUTPUT | MOVEMENT TRAJECTORY TO TASK POINT, AND MOVEMENT QUANTITY |

Fig. 30

INPUT/OUTPUT TO/FROM VISION FUNCTION FOR ERROR DETECTION OF RECOGNITION SECTION

| INPUT | IMAGE ACQUIRED FROM FINGER EYE CAMERA AND PLURALITY OF PIECES OF PART SHAPE DATA |
|---|---|
| OUTPUT | ERROR DETECTION OUTPUT |

Fig. 31

INPUT/OUTPUT TO/FROM RECOGNITION APPLICATION BUILDING SUPPORT FUNCTION OF RECOGNITION SECTION

| INPUT | MODEL INFORMATION, PARAMETER INFORMATION, AND CALIBRATION DATA |
|---|---|
| OUTPUT | RECOGNITION PROCESSING PARAMETERS, MODEL DATA OF OBJECT TO BE RECOGNIZED, AND DATA REPRESENTING RECOGNITION PROCESSING SEQUENCE |

INDUSTRIAL ROBOT SYSTEM INCLUDING ACTION PLANNING CIRCUITRY FOR TEMPORARY HALTS

TECHNICAL FIELD

The present invention relates to an industrial robot system used for a production system for carrying out a product assembly of an object to be manufactured.

BACKGROUND ART

As a major issue to be addressed when a robot is introduced into a production line, a prevention of a temporary halt (a state in which a facility stops or idles due to a temporary trouble) has conventionally been pointed out. The temporary halt constitutes an obstacle to a reduction of a teaching period during the startup/adjustment of a production line, and also constitutes an obstacle to an unattended continuous operation.

As general design steps for a product, a structural design of the product to be manufactured and a layout design of cells used for manufacturing the product by an unattended operation are first carried out. As a result, part connection information (part configuration tree diagram) representing an order relation of connecting parts constituting the product, product design data such as geometric shape data of the parts, facility layout data within cells, and production facility data such as specifications of robots are obtained. Then, programming, installation/adjustment, and teaching tasks for operating each of the facilities such as robots in the production system start.

As a conventional industrial robot system, a technology involving detecting an error occurrence and generating a recovery sequence in order to recover a production facility is proposed for a case in which an operation state can be represented as a binary state (such as ON/OFF) (see Patent Literatures 1 and 2, for example).

Similarly, in order to recover from a failure in a production line, there is proposed a technology in which a control sequence program is constructed in advance block by block, and detection of a failure and activation of a program for recovery are carried out for each block (see Patent Literature 3, for example).

CITATION LIST

Patent Literature

Patent Literature 1: JP 3195000 B2
Patent Literature 2: JP 6-190692 A
Patent Literature 3: JP 3-116304 A

SUMMARY OF INVENTION

Technical Problem

In the conventional industrial robot system, a processing operation for calculating an error recovery method is carried out in advance only for the binary state of each of components of a production system from configuration information on the production system, and there has thus been a problem that a failure which occurs in the production system including robots which can take complex multi-value (ternary or higher) state values cannot be solved.

The present invention has been made in order to solve the above-mentioned problem, and it is therefore an object of the present invention to provide an industrial robot system which reduces a teaching period (installation/adjustment period) upon startup/adjustment of a production system (production line) using industrial robots, and extends a continuous operation period in a no-error state after the start of the operation.

Solution to Problem

According to the present invention, there is provided an industrial robot system including a robot having a manipulator and a hand, and used for a production system for assembling a product which is an object to be manufactured, including: an action planning section for temporary halts for generating task information and a first work path in order to address a temporary halt which constitutes an obstacle to a teaching task when a production line is started up and adjusted, and an unattended continuous operation; an error-inducing-task restraining section for generating error information used for restraining a task inducing an error based on the task information; a section for teaching task for generating a second work path based on the first work path and the error information; an operation mastering section for generating a third work path optimized for the robot based on the second work path; a hand library formed by associating an assembly task of the robot and control software with each other; an optimum-task-operation generating section for generating a operation sequence of specific tasks; a specific task library for storing the operation sequence of specific tasks; an error-recovery-task teaching section for teaching an error recovery task according to an error state based on an operation history in the section for teaching task; an error recovery library for storing the error recovery task; a finger-eye-camera measurement section and a three-dimensional recognition section for generating operation monitoring information on the robot, and inputting the operation monitoring information to the error-inducing-task restraining section, the section for teaching task, and the operation mastering section; and a controller for controlling the robot based on the second work path and the third work path, and on the operation monitoring information, in which: the action planning section for temporary halts generates the first work path based on configuration information on the production system and the object to be manufactured, information stored in the hand library, the specific task library, and the error recovery library, and the error information from the error-inducing-task restraining section; the error-recovery-task teaching section calculates error recovery information on components including the robot based on a cause for occurrence of the error and the operation history from the section for teaching task; and the action planning section for temporary halts, the section for teaching task, and the operation mastering section generate program information including the third work path required for teaching the robot from the configuration information on the production system and the object to be manufactured.

Advantageous Effects of Invention

According to the present invention, it is possible to realize the reduction of the installation/adjustment period of a production line including industrial robots, and the extension of the no-error continuous operation period after the operation starts.

BRIEF DESCRIPTION OF DRAWINGS

FIG. 2 An explanatory diagram illustrating an example of an implementation image of an ecological interface used for Example 1 of the present invention (Example 1).

FIG. 3 An explanatory diagram illustrating input/output information for a section for teaching task according to Example 1 of the present invention (Example 1).

FIG. 4 Explanatory diagrams illustrating an overview of an optimum tact time search in an operation mastering section according to Example 1 of the present invention (Example 1).

FIG. 5 An explanatory diagram illustrating input/output information for the operation mastering section according to Example 1 of the present invention (Example 1).

FIG. 6 A flowchart illustrating a task analysis while considering supplementary tasks such as a temporary halt recovery according to Example 1 of the present invention (Example 1).

FIG. 7 An explanatory diagram illustrating input/output information for an action planning section for temporary halts according to Example 1 of the present invention (Example 1).

FIG. 8 An explanatory diagram illustrating a framework of an error occurrence risk analysis method according to Example 1 of the present invention (Example 1).

FIG. 9 An explanatory diagram illustrating input/output information for an error-inducing-task restraining section according to Example 1 of the present invention (Example 1).

FIG. 10 An explanatory diagram illustrating input/output information for an optimum-task-operation generating section according to Example 1 of the present invention (Example 1).

FIG. 11 A block diagram illustrating a configuration example of a supervised learning system based on deductive learning of knowledge according to Example 1 of the present invention (Example 1).

FIG. 12 An explanatory diagram illustrating input/output information for an error-recovery-task teaching section according to Example 1 of the present invention (Example 1).

FIG. 13 An explanatory diagram conceptually illustrating a configuration of a finger-eye-camera measurement section used for Example 1 of the present invention (Example 1).

FIG. 14 An explanatory diagram illustrating input/output information for a sensor feedback function based on the finger-eye-camera measurement section according to Example 1 of the present invention (Example 1).

FIG. 15 An explanatory diagram illustrating input/output information for a gripping position/attitude measurement function based on the finger-eye-camera measurement section according to Example 1 of the present invention (Example 1).

FIG. 16 An explanatory diagram illustrating, along with a block diagram, an example of three-dimensional measurement/recognition processing according to Example 1 of the present invention (Example 1).

FIG. 17 An explanatory diagram illustrating input/output information for a three-dimensional recognition section according to Example 1 of the present invention (Example 1).

FIG. 18 An explanatory diagram illustrating input/output information for an algorithm design support section according to Example 1 of the present invention (Example 1).

FIG. 21 An explanatory diagram illustrating input/output information for a hand library function of an offline teaching section according to Example 3 of the present invention (Example 3).

FIG. 22 An explanatory diagram illustrating input/output information for an error detection function of the offline teaching section according to Example 3 of the present invention (Example 3).

FIG. 23 An explanatory diagram illustrating input/output information for an error-recovery-level determination function of the offline teaching section according to Example 3 of the present invention (Example 3).

FIG. 24 An explanatory diagram illustrating input/output information for an error-occurrence-risk analysis function of the offline teaching section according to Example 3 of the present invention (Example 3).

FIG. 25 An explanatory diagram illustrating input/output information for an action control function of an error recovery section according to Example 5 of the present invention (Example 5).

FIG. 26 An explanatory diagram illustrating input/output information for a function of enhancing a section for teaching task of the error recovery section according to Example 5 of the present invention (Example 5).

FIG. 27 An explanatory diagram illustrating input/output information for a teleoperation function of the error recovery section according to Example 5 of the present invention (Example 5).

FIG. 28 An explanatory diagram illustrating input/output information for an object recognition function for part picking of a recognition section according to Example 6 of the present invention (Example 6).

FIG. 29 An explanatory diagram illustrating input/output information for a hybrid vision correction function of the recognition section according to Example 6 of the present invention (Example 6).

FIG. 30 An explanatory diagram illustrating input/output information for a vision function for error detection of the recognition section according to Example 6 of the present invention (Example 6).

FIG. 31 An explanatory diagram illustrating input/output information for a recognition application building support function of the recognition section according to Example 6 of the present invention (Example 6).

DESCRIPTION OF EMBODIMENTS

Example 1

Figure 1:
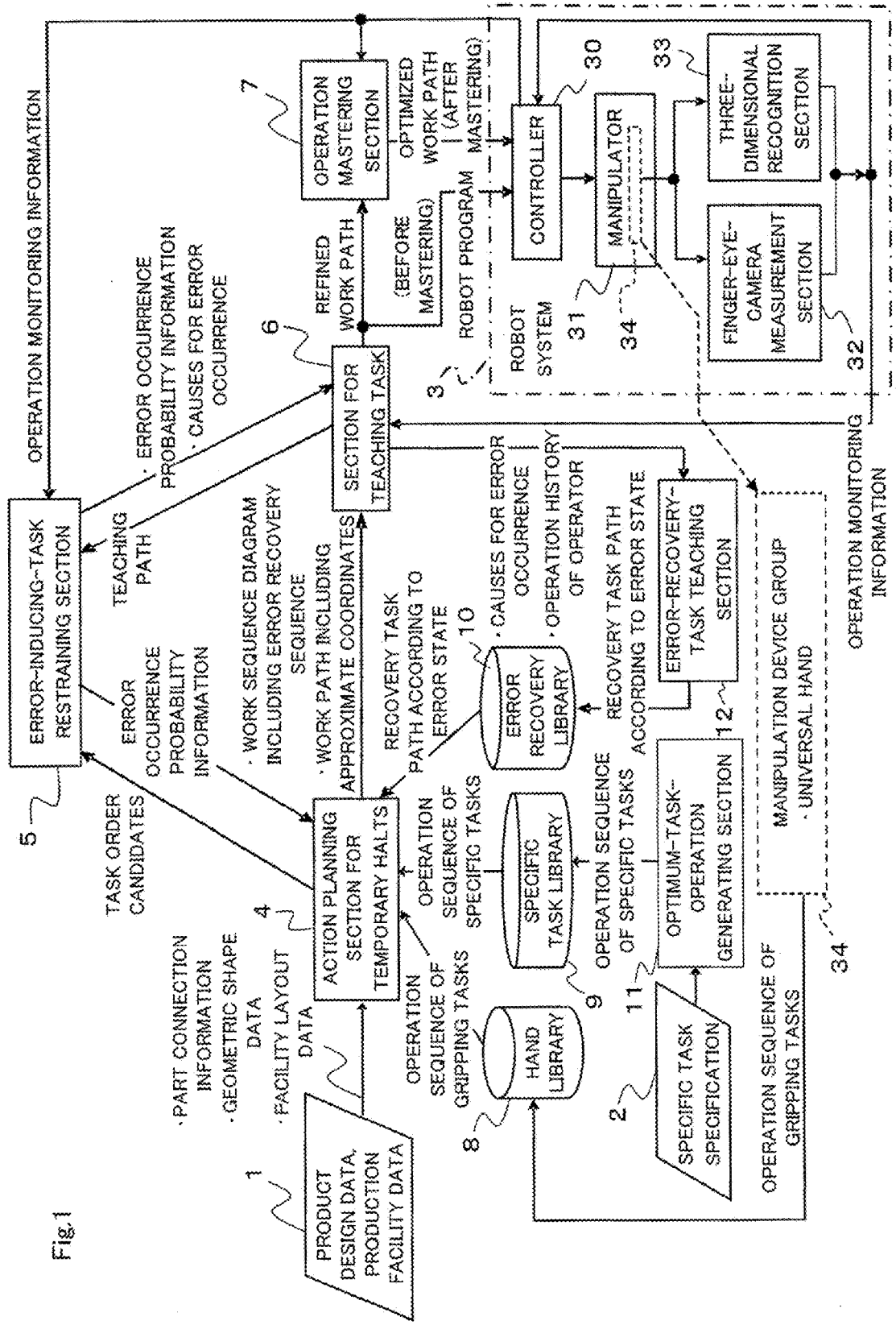
FIG. 1A block configuration diagram illustrating an industrial robot system according to Example 1 of the present invention (example 1).

FIG. 1 is a block configuration diagram illustrating an industrial robot system according to Example 1 of the present invention.

The industrial robot system in FIG. 1 includes product design data and production facility data 1 (including part connection information, geometric shape data, and facility layout data) produced and prepared in advance by three-dimensional CAD, a specific task specification 2 produced and prepared in advance, and a robot system 3 installed in a production line.

Moreover, the industrial robot system includes, as components relating to the production design data and production facility data 1, the specific task specification 2, and the robot system 3, an action planning section 4 for temporary halts, an error-inducing-task restraining section 5, a section 6 for teaching task, an operation mastering section 7, a hand library 8, a specific task library 9, an error recovery library 10, an optimum-task-operation generating section 11, an error-recovery-task teaching section 12, a controller 30, a manipulator 31, a finger-eye-camera measurement section 32, a three-dimensional recognition section 33, and a manipulation device group 34.

The controller 30, the manipulator 31, the finger-eye-camera measurement section 32, and the three-dimensional recognition section 33 are provided in the robot system 3. The finger-eye-camera measurement section 32 and the three-dimensional recognition section 33 constitute an image measurement/recognition section.

Moreover, the manipulation device group 34 is provided in the manipulator 31, and the manipulation device group 34 includes universal hands and the like.

The hand library 8 stores operation sequences of gripping tasks input from the manipulation device group 34.

The specific task library 9 stores operation sequences of specific tasks input from the optimum-task-operation generating section 11 based on the specific task specification 2.

The error recovery library 10 stores recovery task paths according to error states generated by the error-recovery-task teaching section 12 based on causes for error occurrence and operation histories of operators provided from the section 6 for teaching task.

The action planning section 4 for temporary halts produces a work sequence diagram including an error recovery sequence and a work path including approximate coordinates based on the part connection information, the geometric shape data, and the facility layout data out of the product design data and production facility data 1, and the stored information of the respective libraries 8 to 10, and inputs the work sequence diagram including the error recovery sequence and the work path including the approximate coordinates to the section 6 for teaching task.

Moreover, the action planning section 4 for temporary halts is mutually associated with the error-inducing-task restraining section 5 to input candidates of a task order to the error-inducing-task restraining section 5, and acquire error occurrence probability information from the error-inducing-task restraining section 5.

The error-inducing-task restraining section 5 is mutually associated with the section 6 for teaching task to input the error occurrence probability information and the cause for error occurrence to the section 6 for teaching task, and acquire a teaching path from the section 6 for teaching task.

Moreover, the error-inducing-task restraining section 5 generates the error occurrence probability information and the cause for error occurrence based on operation monitoring information from the controller 30 of the robot system 3.

The section 6 for teaching task generates the cause for error occurrence and the operation history of the operator based on the work sequence diagram (including the error recovery sequence) and the work path (including approximate coordinates) from the action planning section 4 for temporary halts, the error occurrence probability information and the cause for error occurrence from the error-inducing-task restraining section 5, and the operation monitoring information from the robot system 3 (finger-eye-camera measurement section 32 and the three-dimensional recognition section 33), and also generates a refined work path (robot program before mastering) for input to the operation mastering section 7 and the controller 30.

The operation mastering section 7 generates an optimized work path (robot program after the mastering) based on the work path from the section 6 for teaching task and the operation monitoring information from the robot system 3, and inputs the optimized work path to the controller 30.

The controller 30 provides control for driving the manipulator 31 and the manipulation device group 34 based on the respective robot programs before and after the mastering, and the operation monitoring information from the finger-eye-camera measurement section 32 and the three-dimensional recognition section 33.

The finger-eye-camera measurement section 32 and the three-dimensional recognition section 33 monitor operations of the manipulator 31 and the manipulation device group 34, and input the operation monitoring information to the controller 30 and the section 6 for teaching task.

A description is now given of an operation according to Example 1 of the present invention illustrated in FIG. 1.

As general design steps for a product by a designer, the structural design of a product to be manufactured, and the layout design for cells used to manufacture the product are first carried out as described above.

As a result, the part connection information (part configuration tree diagram) representing an order relation of connecting parts constituting the product, the product design data such as the geometric shape data of the parts, the facility layout data within the cells, and the production facility data such as specification of the robots are obtained.

The system operation according to Example 1 of the present invention starts from a state in which these results of design tasks by a designer are available.

A description is now given of the system operation according to Example 1 of the present invention when the production facility starts up.

In a first phase, the product design data and production facility data 1 are input to the action planning section 4 for temporary halts.

As a result, a product production task is decomposed into a sequence of smaller tasks, and each of these tasks are assigned to each of the facilities in the cell, and a task order is generated based on the part connection information in the action planning section 4 for temporary halts. On this occasion, in decomposing the task and determining the task order, if a candidate of the task order is given to the error-inducing-task restraining section 5, the error occurrence probability information for the given task is returned, and a task order having a low risk of temporary halt is thus selected. It should be noted that the error occurrence probability is updated at any time by the operation monitoring information while production is being carried out.

It should be noted that the temporary halt refers to a state in which while an automatic/semiautomatic task such as transporting, machining, assembly, or inspection/measurement is being applied to an intended object of task (such as a raw material, a workpiece, and a machining tool) in an automated facility, an abnormal state arises on the intended object of task or a facility portion, and task functions of the facility temporarily halt while the temporary halt is not serious.

Moreover, the respective tasks and the task order are determined, and a "work sequence diagram including an error recovery sequence" including a check point for examining a temporary halt during the task, a recovery point at which the task can be resumed when the check point is not passed, a recovery path for returning to the recovery point, a via point for avoiding an obstacle, work paths connecting the respective points to each other, a sequence describing the execution order of the respective paths, and a synchronization point at which other robots and devices are caused to wait is generated in the action planning section 4 for temporary halts.

Moreover, an attribute label is attached to each of the work paths.

The labels may include "movement between two points", "movement to via pint", "task accompanying action by end effector device", "task according to sensor feedback control such as approaching movement immediately before/after gripping part or task operation optimized in advance", and "during recovery sequence from temporary halt". It should be noted that a plurality of labels may be attached to a single work path.

On this stage, the work sequence diagram includes only the labeled work paths, and the respective points, and does not include contents of each of the work paths.

It should be noted that the content of the work path includes position and attitude coordinates at both ends of the path and via points (a plurality of via points are added according to necessity) and a specification of method of movement between the coordinates (such as a control law and an interpolation method).

Moreover, the task operation optimized in advance includes tips for restraining task errors, and quickly and flexibly carrying out a task.

Further, task operations including a gripping strategy obtained from a structure of a hand optimized based on an attitude for gripping a part (hand library 8), specific tasks such as the peg-in-hole (use of human-type flexible fingers) frequently employed in a production process (optimum-task-operation generating section 11 and specific task library 9), and recovery paths for returning to a recovery point according to an error state (error-recovery-task teaching section 12 and error recovery library 10), namely task operations which have been obtained as knowledge from results of teaching and execution of past robot tasks are used for generating work path candidates in the action planning section 4 for temporary halts.

As a result, it is possible to restrain a past task inducing a temporary halt from occurring again.

As a next phase, rough contents of the work paths for each of the tasks are generated by using the facility layout data within the cells and the task order data in the action planning section 4 for temporary halts.

For example, if there are a part placement location and a work bench in a production cell, and a work path of a specific trajectory for transporting a part is considered for a task for transporting the part from the part placement location to the work bench, a robot may interfere with surrounding objects, and it is eventually necessary to set precise values to instances of each of the work paths.

Each of the work paths is generated at a precision of approximately 5 cm on this occasion, and a reference attitude for gripping an object (relative attitude between the part and the hand) is determined in the section 6 for teaching task on a later stage by an operator using teaching task input means.

The above-mentioned operation is repeated for all the work paths, and data including "work sequence diagram including error recovery sequences+work paths including approximate coordinates" is obtained as the output information from the action planning section 4 for temporary halts up to this phase.

The section 6 for teaching task then starts an operation.

In the section 6 for teaching task, refined work paths to which absolute coordinates are specified are determined by a teaching operator using teaching task input means only by carrying out final positioning of important operation points such as gripping points for the work paths including approximate coordinates.

A user interface based on the ecological interface theory displayed on a personal computer for the teaching task or a teaching pendant presents important operation points and task states on this occasion, and the operator carries out the refining task for the position/attitude, and adds work paths according to necessity on the teaching task input means while observing the presented states.

The task state is acquired by a camera having an omnidirectional field of view provided at a fingertip (manipulation device group 34) of the robot (manipulator 31) in the finger-eye-camera measurement section 32.

An image acquired in this way spans a wide range hardly causing an occlusion in the field of view, and hence the operator easily observes the state of the fingertips of the robot during the manual operation.

Alternatively, the task state is acquired by a force sensor (not shown) provided at the fingertip (manipulation device group 34) of the robot (manipulator 31).

The force sensor is a sensor for measuring both a force and a torque applied to the sensor, and the fingertip of the robot is a finger part of the robot hand or a connection portion between the robot hand and the robot. The same effect is also provided even if a torque sensor is provided for each of axes of joints of the manipulator, and both the forces and torques applied to an arbitrary position of the robot fingertip are estimated by using data acquired from the plurality of torque sensors.

The data acquired by the force sensor can discriminate a small displacement of the robot fingertip position which cannot be discriminated by the camera if the robot fingertip comes in contact with the intended object of task, and the operator thus more easily observes the state of the fingertip of the robot during the manual operation. In other words, the robot fingertip position can be finely adjusted.

In other words, information obtained by matching the data acquired by the force sensor against a model obtained by abstracting a phenomenon occurring on the robot fingertip and prepared in advance, or by assigning the data acquired by the sensor to a model represented by equations to perform calculation is displayed as a phenomenon occurring on the fingertip on an image.

As a result, the operator easily observes the state of the fingertips of the robot during the manual operation.

Moreover, a semi-autonomous mode in which, while a certain attitude is autonomously maintained with respect to an intended object, an instruction to move in a certain direction is given to other axes, or an instruction by an operator is reflected on other axes is realized by causing the finger-eye-camera measurement section 32 to process the acquired image information, thereby acquiring information on normal lines of gripped surfaces of the intended object, which contributes to a reduction in load of the teaching task.

Similarly, if the state of the fingertip of the robot is observed by the force sensor, a semi-autonomous mode in which, while a certain attitude is autonomously maintained with respect to an intended object, an instruction to move in a certain direction is given to other axes, or an instruction by the operator is reflected on other axes is realized by acquiring information on normal lines of contact surfaces of the intended object and the robot fingertip, which contributes to a reduction in load of the teaching task.

The error-inducing-task restraining section 5 is also used in this case, and if an operation inducing a task mistake is taught, a warning is generated.

Moreover, it is necessary to determine, for example, the gripping position/attitude in the section 6 for teaching task, and thus the operator does not simultaneously operate "six degrees of freedom". Instead, the system takes over the complex simultaneous control of the multiple degrees of freedom, and the operator operates only a small number of degrees of freedom.

As a result, there is provided a function of determining the gripping position/attitude while reducing the load.

The refined work paths are then optimized, and work paths (after mastering) are work paths which present smooth work operations, and short tact times are acquired in the operation mastering section 7.

As described above, the action planning section 4 for temporary halts, the error-inducing-task restraining section 5, the section 6 for teaching task, and the operation mastering section 7 generate robot programs for the robot system 3 in relation to the respective pieces of design data 1, the specific task specifications 2, the respective libraries 8 to 10, the optimum-task-operation generating section 11, and the error-recovery-task teaching section 12.

In other words, robot programs executable on the controller 30 including recovery sequences generated if a temporary halt occurs can be obtained from the product design/production facility data 1 while the load on the teaching operator is reduced largely compared with a conventional case.

A description is now given of a system operation performed when the production according to Example 1 of the present invention is carried out.

A robot operation sequence performed when a product is produced is represented by the following items (1) to (6).

(1) Normally, work paths described in robot programs are sequentially followed.

On this occasion, the distance to and the attitude with respect to an intended object are measured in real time using the finger-eye-camera measurement section 32 and the three-dimensional recognition section 33, and the task is carried out according to sensor feedback control in order to absorb a variation of tolerance in part dimension and a variation in positioning, thereby realizing a stable operation.

Moreover, a high-speed, high-precision robot operation is realized by means of, for example, a feedback of image/distance hybrid type using a two-dimensional image feedback having a high processing rate and a three-dimensional distance/attitude data feedback having a slightly lower processing rate.

Moreover, the finger-eye-camera measurement section 32 can measure the gripping position and attitude of a part while the part is gripped, and a correction of errors in position and attitude which are generated when the part is gripped, and a precise positioning by re-gripping can thus be enabled, thereby restraining a temporary halt caused by a displacement.

(2) A plurality of robots or devices are synchronized at a synchronization point.

(3) An examination is carried out at a check point, and the sequence returns to (1) if no abnormality is found.

(4) If the examination is not successful at the check point, a recovery operation is carried out.

(5) The robot returns from an arbitrary position between check points to a recovery point following a recovery path given in advance in the recovery operation, and returns from that point to (1), thereby resuming the operation in a normal mode.

(6) If the robot cannot reach the recovery point after repeating the recovery operation a predetermined number of times or more, the operator is called.

A teaching method for the recovery operation by the operator is recorded in the error-recovery-task teaching section 12, and is utilized as knowledge for producing the robot program next time.

A detailed description is now sequentially given of the section 6 for teaching task, the operation mastering section 7, the action planning section 4 for temporary halts, the error-inducing-task restraining section 5, the optimum-task-operation generating section 11, the error-recovery-task teaching section 12, the finger-eye-camera measurement section 32, the controller 30 (image processing section), the three-dimensional recognition section 33, the manipulation device group 34 (universal hand), and the hand library 8 in relation to the background art.

First, a detailed description is given of the section 6 for teaching task of FIG. 1.

A portion of a teaching task for a robot in which automation is difficult to be attained such as a portion requiring decision making by adjustment on site is responsible for a human operator.

The task is thus supported by providing an effective user interface in the section 6 for teaching task.

As described above, though the "work sequence diagram including error recovery sequences" and the "work paths including approximate coordinates" are acquired as intermediate outputs of the system through the processing by the action planning section 4 for temporary halts, it is necessary to add/modify a specific shape and precise position data of via points of the work path according to actual facilities and parts to be assembled (workpieces) in order to complete the "work sequence diagram including error recovery sequences" and the "work paths including approximate coordinates" as robot programs.

It is thus necessary to consider various requirements such as a reduction in the tact time, avoidance of interferences with other objects, and countermeasures for task phases high in probability of inducing errors in the refinement task of the robot work path.

Particularly, the most important problem lies in teaching in an operation phase in which a physical contact occurs between different objects including a hand such as gripping and assembling a part in order to realize a robust work path for a robot against various variation factors.

Though it is necessary to precisely lead the robot to proper position/attitude in order to teach correct gripping and assembling of a part, determination therefor solely depends on visual recognition of the operator, and is thus a point which reflects skills of the operator.

Moreover, there are variations within tolerance in the dimensions and shapes of a part, and it is thus necessary that a sample and a fixed state thereof used in the teaching task properly represent variations of the part during a continuous operation. Otherwise, uncertainty which is not expected in the taught work path largely increases an error occurrence probability.

The various sensors (finger-eye-camera measurement section 32, three-dimensional recognition section 33, and force sensor (not shown)) constituting a robust recognition intelligent section are utilized as an information source for teaching a robot work path, and measured data (operation monitoring information) acquired from the sensors are visualized in a proper form in the section 6 for teaching task as countermeasures against the problems relating to the teaching task as summarized before.

As a result, it is possible to change the determination made for precise position and the attitude to a more simple and easy determination, thereby promoting efficiency of the teaching task.

Moreover, a countermeasure in the teaching task phase against the variation factors in the assembly task is realized by similarly visualizing information on the variation in the dimension and the shape of the parts to be assembled in the section 6 for teaching task.

If many pieces of numerical data are to be presented on a two-dimensional screen, it is necessary to integrate these pieces of data by a form and an arrangement suitable for the teaching task so that the operator intuitively understands a proper task state. The theory of the "Ecological Interface Design (EID)" may be used as a basis for this purpose.

FIG. 2 is an explanatory diagram illustrating an example of an implemented image of the ecological interface.

In FIG. 2, a mutual relationship between a universal hand 34a of the manipulator 31 and a part W to be assembled is acquired as various types of sensor data, and is visualized and presented as information on the part W to be assembled.

Employment of the operation sequence of specific tasks such as the peg in hole which can be optimized in advance as a template for refining a robot work path is very efficient for reducing labor required for the teaching task.

The section 6 for teaching task thus refers to a operation sequence of specific tasks via the specific task library 9, thereby enabling the operator to use the specific task library 9 for refining a work path.

Moreover, the section 6 for teaching task communicates with the error-inducing-task restraining section 5, always checks whether teaching of a task operation which possibly induces an error is present, warns the operator if corresponding teaching is carried out, and supports execution of an efficient teaching task.

Action generation is carried out always based on a relative relationship between an intended object of task and a surrounding environment in the teaching task for a robot. It is conceived that there are many cases in which a semi-autonomous mode in which sensor feedback is carried out for certain degrees of freedom while an operation by an operator is followed for other degrees of freedom is efficient on this occasion.

Though the information from the image sensor, the distance sensor, and the force sensor are exemplified as expected representative sensor information, if other sensor information is necessary depending on intended purpose of the task, a system function corresponding thereto may be added.

Input/output information for the section 6 for teaching task is illustrated in an explanatory diagram of FIG. 3.

Specifically, the input information includes the work sequence diagram including error recovery sequences, the work path including approximate coordinates, the various types of sensor data, and information on a part to be assembled.

Moreover, the output information includes the refined work paths containing a start point coordinate, an endpoint coordinate, and ranges and resolutions of a plurality of via point coordinates of the work paths.

A detailed description is now given of the operation mastering section 7 of FIG. 1.

A task operation plan for a vertically articulated robot presents complexity caused by high degrees of freedom of a mechanism. For example, even if a trajectory connecting between only a start point and an end point is derived, it is necessary to solve the two-point boundary value problem, and it is difficult to solve this problem either analytically or numerically. Moreover, it is more difficult to optimize a trajectory including a plurality of via points in addition to the trajectory connecting between the start point and the end point.

A method of searching for an optimum trajectory including via points for a vertically articulated robot is thus used in Example 1 of the present invention. This is a method of searching for a semi-optimum solution from observed signals of an operation response obtained by operating an actual robot.

As a result, it is expected that versatility is provided for flexibly adapting to a change of and an increase in complexity of a task environment. As a result, a tact time can be reduced when the same operation is repeated.

FIG. 4 are explanatory diagrams illustrating an overview of an optimum tact time search in the operation mastering section 7.

FIG. 4(a) illustrates an example of a work path of the robot (manipulator 31) routing from a start point (−60, 30, 80, 0, 0, 0) to an end point (60, 30, 80, 0, 0, 0) including one via point (0, J2, J3, 0, 0, 0).

Moreover, FIG. 4(b) illustrates the position of an obstacle D with respect to the robot (manipulator 31) in three views (plan view, side view, and front view).

The via point (0, J2, J3, 0, 0, 0) of FIG. 4(a) is set so as to avoid the obstacle D of FIG. 4(b).

Further, FIG. 4(c) illustrates a concept of the optimum tact time search in three-dimensional perspective view, and respective axes correspond to a joint angle "J2", a joint angle "J3", and the tact time. "J2" and "J3" are included in the coordinates of the via point.

If the via point of FIG. 4(a) is changed in various ways, a tact time is observed for each via point, and a curved surface illustrated in FIG. 4(c) is acquired.

Work paths interfering with the obstacle D are represented as a tact time "0" in FIG. 4(c). On this occasion, the shortest tact times appear in a zone Z1, which is illustrated as a blank in the curved surface. Though a case for only one via point at which only the two joints move is described for the sake of simplicity in FIG. 4(c), a plurality of via points at which a plurality of joints simultaneously change constitute the work path in reality, and it is thus necessary to search a multi-degree of freedom space for the blanked area Z1. Moreover, a search path PS1 having a small number of trials and search paths PS2 and PS2 having a large number of trials are illustrated as thick arrow lines.

A system function for increasing the speed of the search as described above is provided according to Example 1 of the present invention.

Specifically, a framework of the Active Learning in Computational Learning Theory is applied. In other words, the most preferable trial to be tried next time is optimized by using data of results of past trials when a search trial is repeated one after another.

In other words, for a plurality of candidates which can be tried next time, an operation of converting results which are considered to be acquired by trying the respective candidates into numbers, and comparing the numbers with each other, thereby determining an order of the candidates to be tried starting from the next time is carried out. For the conversion of the result into a number, a model for estimating a result to be obtained if a certain candidate is tried is built by using data obtained from past trials, and the candidate considered to be acquired by trying the certain candidate is then converted into a number for each of all the candidates using this model.

The optimization of the candidate using the acquired number may be carried out for each trial or each of a plurality of trials. It is known that an effect of reducing the number of trials is increased by carrying out the optimization for each time.

Actually, if a certain candidate was used for trial, an acquired result is combined with results acquired up to this time. In other words, the model built during the optimization becomes gradually precise as the trial is repeated.

As a result, the number of the trials decreases as a whole, and the "search path PS1 having a small number of trials" is realized as indicated by the "thick arrow line" of FIG. 4(c).

Moreover, if a vibration of the robot arm is large, a next operation cannot be started until the vibration attenuates. If this waiting time becomes long, the tact time becomes long, and it is thus conceived that the attenuation of the vibration is an object to be considered for the tact time reduction.

Though this vibration is caused by an inertial force of the hand/arm and a restoring force generated due to a spring effect of a speed reduction mechanism such as a harmonic drive and a transmission mechanism, a selection of a work path is an important item to be considered.

Actually, a method of discretely instructing task points and check points is common in teaching in a conventional system, and a trajectory considering the vibration restraint is not selected for selecting a movement path between points and a trajectory in a work path. An unwanted vibration is thus excited each time an acceleration/deceleration occurs.

As one of conventional methods which are actually employed for restraining vibration, a notch filter fixed to a natural frequency at the most extended state of the arm is applied to a motor control signal. However, the natural frequency changes according to a change in weight of the workpiece and the attitude of the arm, and it is thus considered that the filter effect is not sufficient. Moreover, a time delay unique to the digital filter conflicts with the reduction in the task period.

A skilled operator of a crane operates a tip of the crane so as to restrain the vibration of a workpiece as much as possible after the workpiece is suspended until the workpiece arrives at a destination, for example. Specifically, this operation is realized by moving the tip position of the crane onto a perpendicular line of the workpiece at a moment at which the workpiece reaches the maximum displaced position of a pendulum due to deceleration/acceleration, and the velocity thus becomes zero.

This means the vibration of the workpiece can be avoided when the workpiece stops if the target position can be set to the maximum displaced position of the pendulum.

The case of the industrial robot system according to Example 1 of the present invention is a system in which the hand and the arm are masses, the harmonic drive acts as a spring element, and motors are integrated, and is thus different from the example of the crane. However, a method of deriving conditions under which the hand does not vibrate at a target position (stop position), and changing an operation trajectory of the robot and an acceleration/deceleration operation pattern is employed. Further, the hand is attached to the tip of the robot. By combining a method of using the hand for damping the arm by causing the hand to act as a dynamic damper or an active dynamic damper, there is provided an effect of further reducing a period required for restraining the vibration.

In other words, a work path having a short tact time can be acquired by alternately carrying out the above-mentioned two tasks in the operation mastering section 7. Moreover, the vibration restraining control of the robot arm also contributes to prevention of a decrease in the positioning precision, and to restraint of the temporary halt.

Input/output data for the operation mastering section 7 is illustrated in an explanatory diagram of FIG. 5.

Specifically, the input information includes the start point coordinate and the end point coordinate of a work path, and the range and resolution of the coordinates of the plurality of via points, task environment information, and robot information.

Moreover, the output information includes the start point coordinate and the end point coordinate of the work path, the coordinates of the plurality of via points, a trajectory through the start point, the endpoint, and the plurality of the via coordinate points, and acceleration/deceleration instructions.

A detailed description is now given of the action planning section 4 for temporary halts of FIG. 1.

Decomposition of a product assembly task into detailed element tasks, assignment of these element tasks to each of facilities, and specific determination of a work sequence and a work path are carried out in a design of a cell production robot system.

A result of this design influences on difficulty of the teaching the robot the element tasks and error recovery processes as well as an efficiency of each of the element tasks carried out by the robot. However, it is necessary to examine items ranging from a microscopic point of view of increasing an efficiency of each of the element tasks carried out by the robot to a logistic point of view of the overall production system in order to design the cell production robot system.

Presently, it is very difficult to design a comprehensively optimum system. Particularly, though supplementary tasks such as processing carried out if a robot hand is changed or a temporary halt occurs have a large influence on the efficiency of the overall cell production robot system, presently there is no tool for examining the influence exerted by those supplementary tasks on an initial design state.

Moreover, though many commercial software programs for simulating a robot operation in detail have been developed, a large amount of labor is required for building a simulation model therefor, and these software programs are not thus suitable for the initial design stage on which the various items need to be simultaneously examined.

The action planning section 4 for temporary halts is then used for quickly carrying out comprehensive evaluation of the cell production robot system including supplementary processes such as the hand change and the error handling on the initial design stage according to Example 1 of the present invention.

The action planning section 4 for temporary halts determines an overview of the robot task in cooperation with each of functional configuration sections of the error-inducing-task restraining section 5 and the optimum-task-operation generating section 11, which are described later.

A specific functional configuration of the action planning section 4 for temporary halts is now described.

First, the action planning section 4 for temporary halts acquires three-dimensional geometric information on the part connection information, the geometric shape data, and the facility layout data from the results of the product structure design and the production facility design (product design data and production facility data 1). Moreover, the action planning section 4 for temporary halts identifies surfaces of geometrical parts which can be gripped, and decomposes a sequence of assembly task into element tasks from those pieces of information. Further, the action planning section 4 for temporary halts generates candidates of the work sequence, and determines facilities to which each of the element tasks is to be assigned based on the processing result thereof.

On this occasion, the action planning section 4 for temporary halts inputs the candidate proposals of the work sequence to the error-inducing-task restraining section 5 and the optimum-task-operation generating section 11, and receives the error occurrence probability information on the candidates of the work sequence from the error-inducing-task restraining section 5.

Then, as illustrated in FIG. 6, the overall assembly task including the supplementary tasks such as the change of the robot hand and the recovery operation upon the occurrence of the temporary halt is analyzed on the planning stage of the work sequence using the error occurrence probability information, and a robust work sequence is determined against the occurrence of the temporary halt.

FIG. 6 is a flowchart illustrating the task analysis considering the supplementary tasks such as the temporary halt recovery.

In FIG. 6, tasks $t_1$ and $t_2$ on the upstream side are carried out according to recovery tasks $c_3$ and $c_4$, respectively, based on determination of an error such as occurrence of the temporary halt.

The action planning section 4 for temporary halts proceeds to a check $c_1$ after a task $t_3$ following the task $t_2$, and checks presence/absence of occurrence of a temporary halt.

If it is determined in the check that a temporary halt is present, error decision is made, and the action planning section 4 for temporary halts proceeds to the recovery tasks $c_3$ and $c_4$. On the other hand, if it is determined that a temporary halt is not present, and the task is thus normal, the action planning section 4 for temporary halts proceeds to a task $t_4$, and a task $t_5$ is carried out after a hand change $c_2$.

As a result, the work sequence including supplementary tasks such as the timing for the hand change and the return from the temporary halt is organized according to the statistical evaluation based on the error occurrence probability information It is desired that the cooperation with the error-inducing-task restraining section 5 be carried out in real time during the designing.

Moreover, a template of a work path may be acquired as input information from the optimum-task-operation generating section 11 according to the type of an element task during the organization of the work sequence of FIG. 6. Task periods can be more precisely estimated during the organization of the work sequence by using this information as a library of task operations which are formed into packages, and provide proficient skills.

An optimum approximate work path for the robot is automatically generated at a precision of approximately 5 cm based on the work sequence determined as described above. The generated approximate work paths are to be output to the detailed design stage such as the teaching for the robot.

On this occasion, recovery points to the tasks $t_1$ and $t_2$ upon error occurrence, synchronization points with other facilities, and the point ($c_1$) for checking success/failure of the defined task are simultaneously determined and output.

As a result, productivity of an overall design/implementation process of the cell production robot system can be largely increased by front-loading consideration (such as consideration for a method of addressing a temporary halt), which has to be sequentially carried out in a post process of the design in a conventional cell production robot system, thereby carrying out proper decision making on an early design stage.

Moreover, the following point can be additionally described as contribution to the teaching task.

In other words, there is provided a merit that the operator can carry out without hesitation a task which causes a robot to actually carry out only a partial sequence, which the operator particularly wants to check, out of the overall sequence, thereby checking the robot operation.

This is because cleanup (returning physical positions of the robot and the peripheral devices to initial positions, and resetting variables of control devices to certain initial values), which the operator conventionally has to take time for and carefully (without making mistakes) carry out, is automated by employing the error recovery sequence.

Input/output information for the action planning section 4 for temporary halts is illustrated in an explanatory diagram of FIG. 7.

Specifically, the input information includes the three-dimensional geometric information on the part connection information and the geometric shape data of the product, and the facility layout data, the error occurrence probability information for the candidates of the work sequence, and the templates of the work path.

Moreover, the output information includes the work sequences including the supplementary tasks, the approximate work paths, points requiring the teaching task, recovery procedures upon error occurrence, the recovery points, the synchronization points, and the part surfaces which the robot can grip.

A detailed description is now given of the error-inducing-task restraining section 5 of FIG. 1.

The error-inducing-task restraining section 5 analyzes a risk of error occurrence during the robot task, provides information necessary for error reduction, and restrains robot operations inducing errors from being set (or being taught) during the task design or the teaching task carried out by the operator.

Specifically, during the task design, the error-inducing-task restraining section 5 estimates risks of the errors (magnitude of influence of and likelihood of error occurrence) which possibly occur in the set work sequence, and supports the action planning section 4 for temporary halts and the optimum-task-operation generating section 11 in setting check points for checking whether or not a task sub-goal is attained for detecting error occurrence and selecting a task method which rarely induces an error (such as starting assembly from the top or bottom).

Moreover, the error-inducing-task restraining section 5 investigates a cause of an error example during the operation, which is detected at a check point, thereby supporting improvement of recovery points and recovery methods in an error recovery method.

Simultaneously, knowledge relating to the error occurrence is formed into a database, thereby supporting future study of error countermeasures.

Moreover, during the teaching task by the operator, the error-inducing-task restraining section 5 warns the section 6 for teaching task that an operation to be instructed next time to the robot has a high risk of generating an unfavorable phenomenon, and teaching is at an entry to a task group having a high risk (or is already present in the middle thereof) as the task by the robot progresses, thereby restraining the task setting which tends to induce an error.

First, there is an "error occurrence analysis method" of identifying an occurrence process of a "system error" which should be avoided by the cell production system using the robots in order to realize the above-mentioned function. This is an analysis in the opposite direction for determining a cause of the occurrence from a system error which is an effect.

On the other hand, the error occurrence risk estimation is an analysis in a forward direction for estimating system error occurrence from task conditions, and estimates how the error occurrence risk successively changes as the task progresses.

It is possible to refer to system engineering methods used for the system risk analysis for consistently carrying out the analysis in both directions.

While a dependency between task characteristics and the error occurrence probability are being considered using a Bayesian network, the risks of error occurrence are successively updated based on task information added as the task progresses.

Further, the degree of details of the design information to be used is different between the early stage and the teaching stage for the designing of a task to be carried out by the robot, and thus a hierarchical analysis method according to the stage is used to enable a consistent analysis starting from qualitative information to quantitative information.

Moreover, basic error-relating information relating to system components is accumulated as information source such as the failure mode and effects analysis so that the basic error-relating information is used again by other functional configuration sections for examining the error recovery method and the like.

FIG. 8 is an explanatory diagram illustrating a framework of an error occurrence risk analysis method (risk analysis result of error occurrence), and illustrates a causal relationship between error occurrence and causes as a Bayesian network.

In FIG. 8, M stages of task 1 to task M proceed following a sequence: task 1→task 2, . . . , →task M, and respectively have influential relationships (refer to dotted arrow lines) with N of a cause 1 to a cause N.

Moreover, each of the cause 1 to the cause N has causal relationships with n of an occurrence condition 1 to an occurrence condition $n_i$ relating to an error i, and leads to occurrence of the error i.

If a risk of error occurrence is estimated, estimation processing is carried out from tasks (lower stage side of the figure) to the occurrence of errors (upper stage side of the figure).

Conversely, if a cause of error occurrence is identified, identification processing for a cause is carried out from occurrence of an error (upper stage side of the figure) to tasks (lower stage side of the figure).

Input/output information for the error-inducing-task restraining section 5 is illustrated in an explanatory diagram of FIG. 9.

Specifically, the input information includes a work sequence diagram illustrating work sequences, the work sequence diagram including error recovery sequences, information such as basic design specifications of the facilities and the robots, and the teaching data by the operator.

Moreover, the output information includes transition information on the error occurrence probability based on the work sequence, estimated result/warning of error occurrence probability, and information on causes/countermeasures for error occurrence.

A detailed description is now given of the optimum-task-operation generating section 11 of FIG. 1.

In the assembly task carried out by a robot, a "part assembly" phase in which a part held by the hand and a workpiece to which the part is to be assembled can physically contact with each other is one of the phases in which a trouble leading to a temporary halt or the like is most likely to happen.

Moreover, even for absolutely the same part or workpiece, it is known that a large difference in frequency of trouble generated in the "part assembly" phase often occurs between a work path taught by a proficient engineer and a work path taught by a person who is not proficient.

This is because there are "proficient skills" for realizing the "part assembly" phase in a simple and robust way even for the assembly task carried out by a robot, and may be interpreted that a work path reflecting the proficient skills hardly causes troubles.

The optimum-task-operation generating section 11 outputs templates of optimum work paths reflecting the "proficient skills" for a certain number of typical assembly process patterns (hereinafter, each of patterns of assembly process is referred to as "specific task").

As a result, in the section 6 for teaching task, a robust work path can be easily taught by referring to the template of the optimum work path without depending on experiences of proficient engineers.

Example 1 of the present invention is a method of generating offline the above-mentioned template of the optimum work path for each of the specific tasks according to the gripping attitude of a part for realizing the above-mentioned teaching.

There are various errors in an assembly task by a robot such as task error/teaching error which occurs when the manipulator 31 operates the hand, relative position/attitude errors between the hand and a part, dimension/shape errors of a part/workpiece, and position/attitude errors of a workpiece, and it is conceived that a nature of these errors as probability variables generates uncertainty of a task result.

A basic idea of Example 1 of the present invention is a point that the above-mentioned "proficient skills" are considered as "skillfulness adapting to the uncertainty of those errors". Then, a scale (entropy) for quantitatively evaluating the uncertainty generated by an error is introduced, and comparison among different work paths is enabled based on how the entropy changes in the course of the work path.

An algorithm which constructs a work path template based on which the robot can skillfully handle the uncertainty according to input information is acquired by developing an approach for constructing (or searching for) a work path in which the uncertainty can be skillfully handled.

Further, the work path is further improved by adding a logic of searching a neighborhood to the work path template obtained by this "work path template construction algorithm".

As a specific procedure, "a process of inserting a part into a hole or a slot of a workpiece" as a pattern of the assembly process which is most often seen on an actual manufacturing site is first taken as the specific task.

This insertion process varies in nature according to the shape of a part, and thus the process for a so-called peg-in-hole, which is the most general shape, is considered in the first step, and a shape for the process gradually extends to a more complicated shape.

Input/output information for the optimum-task-operation generating section 11 is illustrated in an explanatory diagram of FIG. 10.

Specifically, the input information includes the type of a specific task (such as the peg-in-hole), design information (such as a dimension and a shape) of part/workpiece, major errors to be considered and distributions thereof, gripping attitudes of the part (a plurality of possible candidates are generally given), robot information (such as possible element operations and control laws), and available sensor information.

Moreover, the output information includes templates for a work path including conditional branches (respectively output if there are a plurality of candidates of the gripping attitude), via points on the work path templates, and implication of element work sequences.

A detailed description is now given of the error-recovery-task teaching section 12 of FIG. 1.

The operation of a robot recovering from an error state including a temporary halt is presently provided by an operator, and the operator switches a strategy of the recovery operations according to the error state. The operator thus learns each of the operations based on experiencing an effect of a recovery.

Specifically, an aspect of an object to be controlled which has caused the error state is divided into cases, and a control law for local recovery for each of the cases is learned as a control law as general as possible corresponding to a cause of the error by going back a state transition which has reached to the error state, thereby identifying a direct/indirect cause of the error.

The learning is divided into major two phases on this occasion. One phase is to group various error states, and the other phase is to acquire a general control law for recovery in each of the grouped error states. These two learning phases cannot be separated from each other, and the learning proceeds in a "co-evolutional manner" according to the learning in each of the phases.

A "learning method from a single example" using the explanation-based learning (EBL), which is a representative method of the deductive learning, is applied according to Example 1 of the present invention.

In this learning method, a system generates an explanation for why an input of a given recovery operation sequence for a single teaching example (namely, an error recovery taught as demonstration) can be a model example.

Portions of the training example where teaching know-hows are utilized are selectively extracted, and are used for generating knowledge generalized into an expression form (operability norm) defining a standard for applicability of the knowledge (namely, general control law).

On the other hand, the grouping of the error state is carried out while assignment to the most proper typical class is successively determined out of sequences of the error recovery operation given as the teaching examples. A scale of category usefulness is used for the assignment on this occasion.

An added new example (error state to be grouped) is caused to temporarily belong to a candidate typical class, an attribute value distribution within the class is updated, and the category usefulness is then calculated.

A procedure of the typical class generation starts from a class including a single error state, and reorganization of typical classes is determined and carried out based on an evaluation criterion of the category usefulness while the following four class operations are applied each time a new example is added to the class. Specifically, the category usefulness is calculated for each of the four operations: addition of an existing class; generation of a new class having a single example; unification of a plurality of existing classes; and decomposition of an existing class. An operation which maximizes the category usefulness is then carried out. As a result, successive optimization for grouping and identification of an error state is enabled.

FIG. 11 is a block diagram illustrating a configuration example of a supervised learning system based on the deductive learning of knowledge described above.

In FIG. 11, the supervised learning system includes a learning block for grouping errors and a control law learning block for recovery operations.

The learning block for grouping errors includes N typical classes 1 to N branching from a repertory of errors.

Moreover, the control law learning block for recovery operations includes a stage of teaching recovery operations corresponding to each of the typical classes 1 to N by the operator, a stage of inputting sequences of the recovery operation, a stage of learning general laws from one corrected example by means of the explanation-based learning, namely, EBL, N control laws 1 to N constituted of each of leaning results of the general laws, and background knowledge (database) for generating explanation based on the learning results of the general laws.

Further, the learning block for grouping errors is reconstructed in response to addition of an example based on the learning results of the general laws.

The knowledge acquired by the supervised learning system of FIG. 11 is acquired in the expression form satisfying the operability norm, and can be directly compared with "error states" other than the error state taught as the demonstration.

Therefore, a recovery operation from the same grouped error state is automatically carried out without an intervention of a teaching person by applying this control law. As a result, it is expected that the frequency and teaching period of the conventional teaching task be largely reduced.

Input/output information for the error-recovery-task teaching section 12 is illustrated in an explanatory diagram of FIG. 12.

Specifically, the input information includes a cause of each error occurrence, a robot operation sequence upon each error occurrence, and a recovery operation history by the operator for each error.

Moreover, the output information includes a general recovery task path and a recovery operation sequence for a grouped error state.

A detailed description is now given of the finger-eye-camera measurement section 32 of the image measurement/recognition section of FIG. 1.

Though there is conventionally a hand eye camera provided at a position close to a tip of an arm of the manipulator 31, an object of the conventional camera is to obtain an effect of moving a view point using the degrees of freedom of the arm rather than to observe a periphery including the hand tip and an intended object, and it is assumed that the conventional camera observes the intended object at a certain distance. The conventional camera does not thus have a structure for sufficiently recognizing a close/contact state between the hand tip and the intended object or the peripheral environment, or a state of the object being gripped, which are important in the teaching or a recovery operation from a temporary halt, and an occlusion caused by the arm itself and the peripheral environment thus possibly occurs.

Therefore, a camera according to Example 1 of the present invention is a finger eye camera (camera for simultaneously measuring fingertip and periphery) having an ultra-small optical system which can be disposed at a position relatively close to the fingertip of the hand of the manipulator 31, and can observe image information in a wide range including the peripheral environment.

FIG. 13 is an explanatory diagram conceptually illustrating a configuration of the finger-eye-camera measurement section 32.

In FIG. 13, the finger eye camera is constituted by a high speed camera 32a and an omnidirectional mirror 32b, and is configured to take a reflected image of the omnidirectional mirror 32b by the high speed camera 32a.

The high speed camera 32a is provided for each finger of the robot hand 34b positioned at the tip of the manipulator 31, and the omnidirectional mirror 32b is provided so as to be opposed to the finger and the high speed camera 32a.

The high speed camera 32a inputs an image taken by the robot hand 34b, as the operation monitoring information, in the section 6 for teaching task and the controller 30, and inputs the image via the controller 30 to the error-inducing-task restraining section 5 and the operation mastering section 7.

The image information acquired from the high speed camera 32a not only helps the teaching task by a manual operation of the operator and the temporary halt recovery operation, but is also used as an image input for sensor feedback control in the controller 30.

The image information can be used for autonomous and semi-autonomous configuration of the various tasks in this way.

The finger eye camera can be used to promote the observation of the hand tip state of the manipulator 31, and to adaptively select lateral image information, thereby using the image information as an image for sensor feedback even if an intended object in the fingertip direction cannot be directly observed due to an occlusion.

Moreover, the finger eye camera can accurately measure a distance distribution in a periphery of the fingertip of the manipulator 31 by providing a near distance measurement function.

Even if the finger eye camera is used in conjunction with a camera provided in the environment, the same effect is provided.

A detailed description is now given of the image processing section in the controller 30 of FIG. 1 for a path guidance by means of the sensor feedback control.

Conventionally, feedback control according to a residual in a single image plane acquired from a single camera is basically carried out in the feedback (visual feedback) using an image, and as the distance information, simple distance measurement information based on a constant condition or an object size is used.

However, highly precise feedback control in the three-dimensional space is difficult using those methods.

In view of the above, Example 1 of the present invention solves this problem by means of the feedback of an image/distance hybrid type using a two-dimensional image feedback having a high processing rate and a distance/attitude data feedback having a slightly low processing rate.

Moreover, the semi-autonomous mode in which, while a certain attitude is autonomously maintained with respect to an intended object, an instruction to move in a certain direction is given to other axes, or an instruction by the operator is reflected on other axes is realized by, for example, using normal line information of the distance.

Further, according to Example 1 of the present invention, there is provided a gripping position/attitude measurement function for recognizing gripping position/attitude of an intended object in a gripped state based on the image information acquired by the finger eye cameras.

A constraint on an attitude is generally imposed in a state in which a part is gripped, and thus a point that the image processing section in the controller 30 can recognize the position/attitude of the object by means of relatively simple image processing such as three-dimensional matching processing limited to search specification using edge processing is used.

As a result, it is possible to maintain position/attitude accuracies even if the attitude of a part changes during the gripping work.

Input/output information for the sensor feedback function (controller 30) based on the finger-eye-camera measurement section 32 of the image measurement/recognition section is illustrated in an explanatory diagram of FIG. 14.

Specifically, the input information includes a camera image, near distance data, reference model data, end point model data, and calibration data (internal, external), and the output information includes target deviation data.

On the other hand, input/output information for the gripping position/attitude measurement function (controller 30) based on the finger-eye-camera measurement section 32 is illustrated in an explanatory diagram of FIG. 15.

Specifically, the input information includes the camera image, the reference model data, and the calibration data (internal, external), and the output information includes position/attitude data of an intended object.

A detailed description is now given of the three-dimensional recognition section 33 of the image measurement/recognition section of FIG. 1.

Dense distance distribution data is generally obtained by projecting a patterned light beam according to an active three-dimensional measurement method, and thus a distinctive feature such as a cutout feature is not necessary on the intended object itself. Therefore, more general position/attitude recognition is possible.

However, it is necessary to efficiently process a large amount of three-dimensional data, and three-dimensional position/attitude recognition algorithms presently under development are not considered to be sufficient in terms of practical performances such as a processing time.

Up to now, a position/attitude recognition algorithm (three-dimensional matching method) based on a three-dimensional distance distribution model illustrated in FIG. 16 has been produced on a trial basis in the company which the inventor belongs to.

FIG. 16 is an explanatory diagram illustrating, along with a block diagram, an example of three-dimensional measurement/recognition processing.

In FIG. 16, an object 40 to be measured which is formed of a part of a piping, for example, is measured by a small three-dimensional sensor 41 including a laser device and a three-dimensional camera.

First, the three-dimensional sensor 41 irradiates the object 40 to be measured with laser light while scanning the laser light, and takes an image of the object 40 to be measured by the three-dimensional cameras while measuring distances to the object 40 to be measured.

The three-dimensional sensor 41 then calculates a distance distribution of the object 40 to be measured, and represents the distance values in tone on the image data, thereby acquiring a three-dimensional measurement result 42 of the object 40 to be measured.

Finally, the three-dimensional sensor 41 carries out recognition processing for the position/attitude of the object 40 to be measured, and superimposes a result of fitting a model (bright area) on the measured data (dark area), thereby acquiring a three-dimensional model 43 of the object 40 to be measured. FIG. 16 illustrates an example of acquiring a recognition result of a plurality of objects to be measured.

However, in Example 1 of the present invention, it is desirable to further enhance a practical performance in terms of high speed and robustness for an application to a task of picking parts from stacked part supply boxes (trays) and in a kitting state.

Thus, according to Example 1 of the present invention, an offline analysis of a search tree representing an attitude hypothesis for increasing an efficiency, a reduction of the processing time by means of a high-speed architecture on a computer, and the like are carried out in the three-dimensional attitude recognition processing.

Further, if a lack of measured data or the like occurs, recognition processing is carried out using only information on a measured part while ambiguity is remaining in terms of the position/attitude recognition, and the intended object in the gripped state is measured again after the picking task, thereby determining a gripping position/attitude, resulting in systematic realization of a robust picking function.

It is necessary for an operator to have abundant knowledge about image processing if an image processing algorithm is designed in a conventional system. Moreover, though efficient processing is enabled by combining two-dimensional processing and three-dimensional processing for the three-dimensional recognition, more knowledge about the design is required.

According to Example 1 of the present invention, bidirectional cooperation with the respective functional configuration sections relating to the temporary halt handling is thus provided so that a proper algorithm design is carried out by combining two-dimensional processing and three-dimensional processing according to a shape and texture characteristics of the intended object, thereby supporting the design task carried out by the operator.

As the three-dimensional data used in Example 1 of the present invention, it is assumed that data obtained from three-dimensional sensors having necessary specifications such as three-dimensional data acquired by a compact three-dimensional range finder developed by the company to which the inventor belongs and the above-mentioned finger eye camera is used.

Input/output information for the three-dimensional recognition section 33 of the image measurement/recognition section is illustrated in an explanatory diagram of FIG. 17.

Specifically, the input information includes the distance distribution data, the camera image, the reference model data, and the calibration data (internal, external), and the output information includes position/attitude data of an intended object.

Moreover, input/output information for an algorithm design support section: the image measurement/recognition section is illustrated in an explanatory diagram of FIG. 18.

Specifically, the input information includes surface characteristic data, three-dimensional shape data of an intended object, the camera image, and the calibration data (internal, external), and the output information includes success/failure of recognition and an algorithm design plan.

A detailed description is now given of the universal hand of the manipulation device group 34 and the hand library 8 storing the operation sequences of gripping tasks from the manipulation device group 34.

Though effectiveness of each of the above-mentioned functional configuration sections is exerted only if it is applied to the actual physical world, the effectiveness also holds true for the error recovery operation in addition to normal task operations.

Specifically, even if operation strategies in the normal state and the error state are designed, it is meaningless if physical means is not provided for realizing the strategies. Moreover, if a form of a physical action element is not known, a correct action plan itself cannot be constructed.

Therefore, end effectors typified by a hand and drive technologies therefor (manipulation technologies) are indispensable as element technologies, and have large influence in both directions on each of the above-mentioned functional configuration sections relating to the temporary halt handling.

A conventional end effector of a production robot often uses a gripper of a simple open/close type driven pneumatically, and dedicated hands are respectively provided according to the shape of a workpiece to be gripped.

Though the operation strategy is simple in the conventional dedicated hand system, there are problems in that design/production periods are long, the cost is high, and the number of hands required for adapting to various types of products is enormous.

In contrast, according to Example 1 of the present invention, as a solution in place of the dedicated hands, a universal hand may be provided for the cell production robot system.

However, development of a single all-purpose universal hand which can handle all assembly tasks is not practical, and a hand which is not more complex than necessary should be designed according to intended tasks.

Moreover, for the universal hand of multiple degrees of freedom, it is not sufficient only to design a mechanism thereof, but it is necessary to consider a gripping strategy and the like up to a point of gripping a workpiece.

Then, there is provided a framework in which the hand library 8 is generated by forming shapes of parts to be handled by the universal hand, fingertip positions of the universal hand suitable for gripping the parts, gripping strategies for surely gripping workpieces in a specified attitude even if the positions of the workpiece vary more or less, and specific hand mechanisms for realizing the fingertip positions and operations of the universal hands into a library, information on an intended assembly task is input, and a universal hand mechanism suitable for the assembly task is consequently presented.

Figure 19:
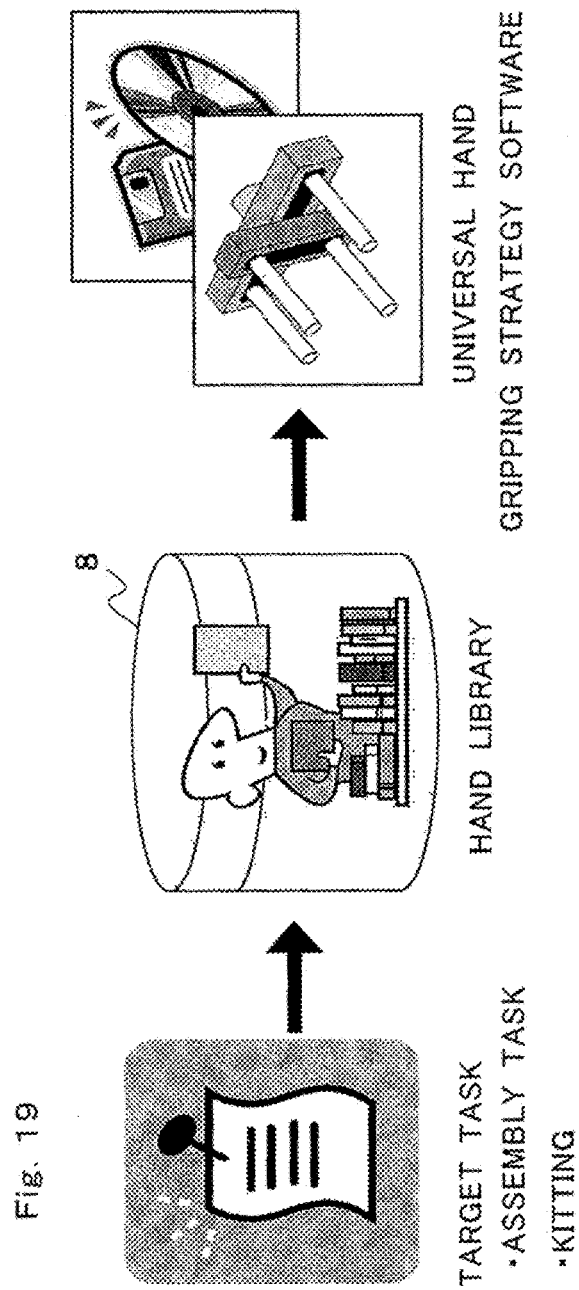
FIG. 19 An explanatory diagram graphically illustrating a concept of a hand library according to Example 1 of the present invention (Example 1).

FIG. 19 is an explanatory diagram graphically illustrating a concept of the hand library 8.

In FIG. 19, the hand library 8 associates a gripping strategy software program of the universal hand with a target task including an assembly task and kitting, and organizes the associations as a library.

It is conceived that the gripping positions and the gripping strategies are determined in terms of the form closure and the force closure.

The hand library 8 can be used for the action planning and the teaching task by cooperating with each of the functional configuration sections relating to the temporary halt handling in addition to for the mechanism design.

The information on the positions of the gripping points are made into the library according to a given part shape and other conditions in the hand library 8, and it is thus not necessary to teach operations of the hand during an actual teaching task. Moreover, even if errors in predetermined ranges are contained in initial position/attitude of a part, it is possible to largely reduce a period required for the teaching by organizing robust gripping strategies, which finally attain prescribed position/attitude, into a library.

As described above, the industrial robot system according to Example 1 of the present invention includes the robots (robot system 3) having the manipulator 31 and the hand (manipulation device group 34), is an industrial robot system used for a production system for assembling a product which is an object to be produced, and includes the action planning section 4 for temporary halts for generating the task information and a first work path (work path including approximate coordinates) for addressing a temporary halt which constitutes an obstacle to the teaching task when a production line is started up and adjusted, and the unattended continuous operation, and the error-inducing-task restraining section 5 for generating the error information (error occurrence probability information and causes for error occurrence) used for restraining tasks inducing errors based on the task information.

Moreover, the industrial robot system according to Example 1 of the present invention includes the section 6 for teaching task for generating a second work path (refined work path) based on the first work path and the error information, and the operation mastering section 7 for generating a third work path optimized for the robot (optimized work path) based on the second work path.

Moreover, the industrial robot system according to Example 1 of the present invention includes the hand library 8 formed by associating the assembly task of the robot and the control software with each other, the optimum-task-operation generating section 11 for generating operation sequences of specific tasks, the specific task library 9 for storing the operation sequences of specific tasks, the error-recovery-task teaching section 12 for teaching an error recovery task according to an error state based on the operation history in the section 6 for teaching task, and the error recovery library 10 for storing the error recovery tasks.

Further, the industrial robot system according to Example 1 of the present invention includes the finger-eye-camera measurement section 32 and the three-dimensional recognition section 33 for generating the operation monitoring information of the robot, and inputting the generated information to the error-inducing-task restraining section 5, the section 6 for teaching task, and the operation mastering section 7, and the controller 30 for controlling the robot based on the second and third work paths and the operation monitoring information.

The action planning section 4 for temporary halts generates the first work path based on the configuration information of the production system and the object to be manufactured (product design data and production facility data 1), each pieces of information stored in the hand library 8, the specific task library 9, and the error recovery library 10, and the error information from the error-inducing-task restraining section 5.

The error-recovery-task teaching section 12 calculates the error recovery information for components including the robot in advance based on the cause for error occurrence and the operation history from the section 6 for teaching task.

Moreover, the action planning section 4 for temporary halts, the section 6 for teaching task, and the operation mastering section 7 generate the program information including the third work path required for teaching the robot from the configuration information of the production system and the object to be manufactured.

In this way, the reduction of the installation/adjustment period for the production system using the industrial robots, and the extension of the error-free continuous operation period after the operation starts can be realized by calculating, in advance, the error recovery method for each of the components including the robot which can take multi-value state from the configuration information on the production system and the object to be manufactured, and by generating the information required for teaching the robot from the configuration information on the production system and the object to be manufactured.

Example 2

The general example in which most of the respective functional configuration sections 4 to 12 are implemented as so-called software on a personal computer is described in Example 1 (FIG. 1). However, control devices for production facilities including personal computer OSes, various real time OSes, and no OS are mixed in the real world of the factory automation, and it is thus necessary to use software serving as glue for data exchange, data exchange, data communication, data exchange, and media conversion in a distributed environment of intelligent module software implemented as software on a personal computer such as the RT (robot technology) platform and various control devices. Therefore, mashup sections 51 and 52 may be provided as illustrated in FIG. 20.

Figure 20:
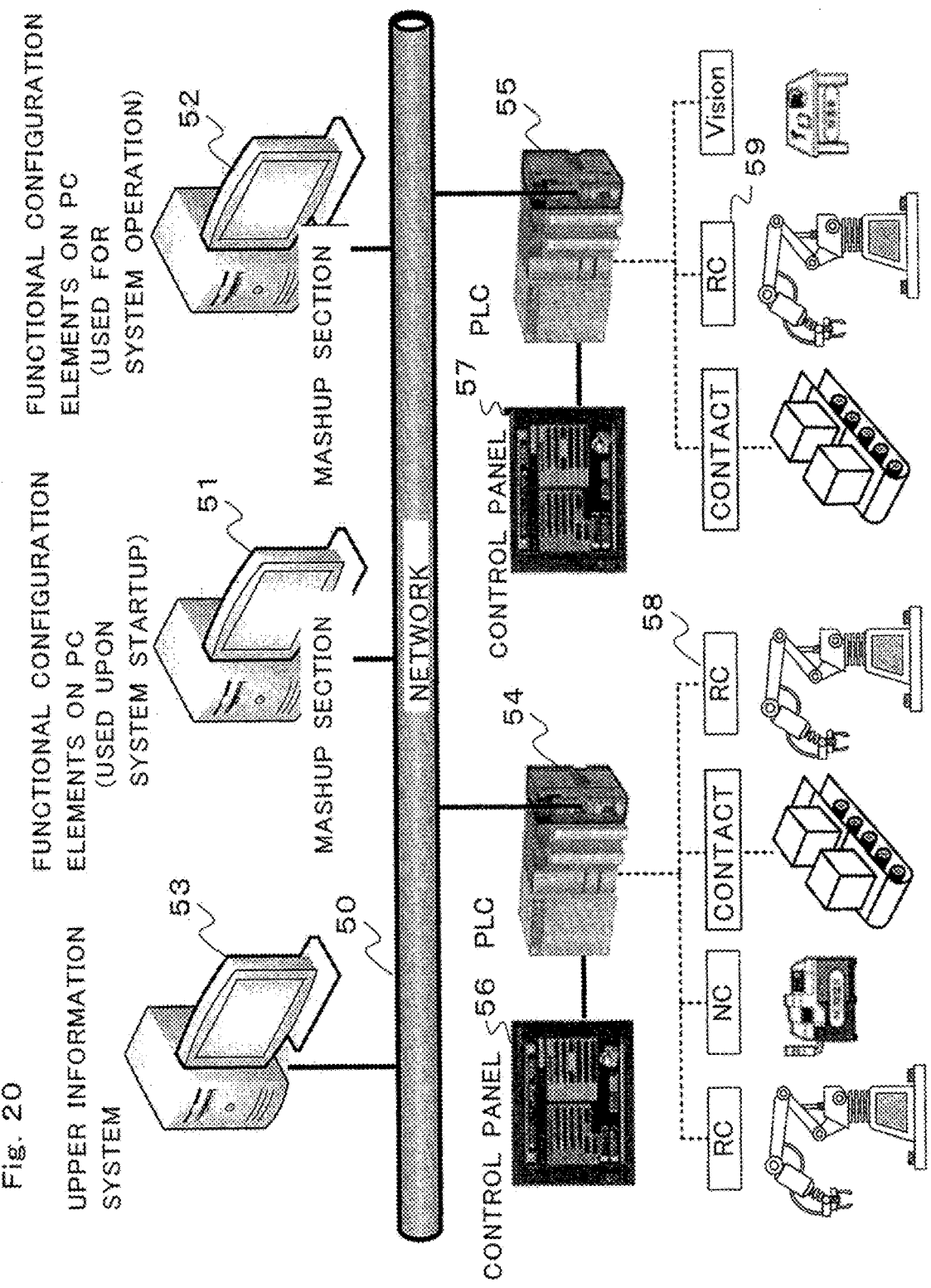
FIG. 20 An explanatory diagram conceptually illustrating an industrial robot system according to Example 2 of the present invention (Example 2).

FIG. 20 is an explanatory diagram conceptually illustrating an industrial robot system according to Example 2 of the present invention, and illustrating a positional relationship of the mashup section 51 for realizing the cooperation of each of functional configuration elements in a production system of the real factory automation.

In FIG. 20, the mashup sections 51 and 52, an upper information system 53, and programmable logic controllers (PLCs) 54 and 55 are connected to a network 50, and control panels 56 and 57 are respectively connected to the PLCs 54 and 55. Moreover, the PLCs 54 and 55 are respectively provided with robot controllers (RCs) 58 and 59.

The mashup sections 51 and 52 are functional configuration sections on a personal computer, one mashup section 51 is used for the system startup, and the other mashup section 52 is used for the system operation.

The mashup sections 51 and 52 are each constructed by a configuration setting function (A1), a PLC/RC conversion function (A2), an execution kernel section (A3), and a safety function (A4).

The configuration setting function (A1) is a setting tool, is constructed by a configuration provided with a GUI, and has a function of collecting data on an arrangement of dedicated controllers for FA and configurations of devices in advance, and referring to the collected data when each of the functional configuration sections (A2) to (A4) is executed.

The PLC/RC conversion function (A2) has a function of distributing programs intended for FA controllers to the FA controllers specified by the configuration setting function (A1) after programs for controllers of the production facilities including the robots are developed using the functional configuration section on a personal computer, distributes the programs converted to a sequence language to the PLCs 54 and 55, and distributes the programs converted to a robot language to the RCs 58 and 59.

Moreover, the PLC/RC conversion function (A2) also distributes program portions used for synchronizing operations among the control devices after assigning specific physical contact numbers or logical variable numbers.

The execution kernel section (A3) marshals operations of the functional configuration elements used for the execution on the personal computer, thereby administrating the overall execution of operations, and administrates interfaces if each of the controllers and the functional configuration elements on the personal computers cannot directly communicate with each other due to difference in OS or the like.

The safety function (A4) has a bridging function for exchange of an interlock signal between the functional configuration element on the personal computer and a so-called safety system constructed as hardware.

As described above, the industrial robot system according to Example 2 of the present invention includes the mashup sections 51 and 52 for realizing the cooperation with the action planning section 4 for temporary halts, the error-inducing-task restraining section 5, the section 6 for teaching task, the operation mastering section 7, the hand library 8, the optimum-task-operation generating section 11, the specific task library 9, the error-recovery-task teaching section 12, the error recovery library 10, and the controller 30. Thus, even if industrial robots are constructed by general-purpose personal computers, dedicated FA controllers, and a safety system, it is possible to reduce the installation/adjustment period of a production system using the industrial robots, and to extend the no-error continuous operation period after the operation starts.

Example 3

Though an offline teaching section including an error detection function for detecting a task error, and also including the functions of the error-inducing-task restraining section 5 and the hand library 8 may be provided as illustrated in FIGS. 21 to 24, which is not particularly mentioned in Example 1 (FIG. 1).

The error detection function for detecting a task error and the error restraining function for restraining an error from occurring are effective, and Example 3 of the present invention thus includes the offline teaching section including these functions.

The offline teaching section includes an error-recovery-level determination function and an error occurrence risk analysis function in addition to the error detection function, the error restraining function, and the hand library function.

The error detection function of the offline teaching section supports building of a task error detection logic from various types of sensor information (robot position, time limit, joint torque, force sensor output value, and image sensor output value). A serious error for which an emergency stop is required is detected by setting a limit value directly to the sensor output value.

The error-recovery-level determination function of the offline teaching section uses a conditional branch based on the sensor information to support determination of an error level to be used for the error recovery and embedment of check points for recovery.

The error-occurrence-risk analysis function of the offline teaching section is a function of analyzing a risk of unwanted incident, and is used in order to restrain a task error of a robot on this occasion. Specifically, if there are a plurality of candidates for work sequences and task attitudes of a robot, risks of occurrence of various errors are calculated as probabilities by statistically processing past error information for each candidate, and the calculated values are compared with each other to select a task, thereby enabling frontloading the restraint of the error occurrence.

The error information used for the analysis includes sensor information recorded upon the error recovery, and recorded descriptions of errors.

Input/output information for the hand library function of the offline teaching section is illustrated in an explanatory diagram of FIG. 21.

Specifically, the input information includes the part shape, and the output information includes gripping possibility, and gripping position/attitude values.

Input/output information for the error detection function of the offline teaching section is illustrated in an explanatory diagram of FIG. 22.

Specifically, the input information includes the various types of sensor information (robot position, time limit, joint torque, force sensor output value, and image sensor output value), and the output information includes the task error detection logic.

Input/output information for the recovery-level determination function of the offline teaching section is illustrated in an explanatory diagram of FIG. 23.

Specifically, the input information includes the work sequence diagram illustrating work sequences, and the output information includes a work sequence diagram in which check points for determining an error level and for recovery used upon the error recovery have already been embedded.

Input/output information for the error-occurrence-risk analysis function of the offline teaching section is illustrated in an explanatory diagram of FIG. 24.

Specifically, the input information includes the work sequence diagram illustrating work sequences, the work sequence diagram including error recovery sequences, information such as the basic design specifications of the facilities and the robots, and the teaching data by the operator.

Moreover, the output information includes the transition information on the error occurrence probability based on the work sequence, the estimated result/warning of error occurrence probability, and the information on causes/countermeasures for error occurrence.

As described above, the industrial robot system according to Example 3 of the present invention includes the offline teaching section having the error detection function, and the offline teaching section has the functions of the error-inducing-task restraining section 5 and the hand library 8. It is thus possible to reduce the installation/adjustment period of a production system using the industrial robots and to extend the no-error continuous operation period after the operation starts.

Example 4

A visual I/F and a teleoperation function may be provided for the section 6 for teaching task, which is not particularly mentioned in Example 1 (FIG. 1).

It is efficient to use a teleoperation section to realize intuitive operation on the teaching pendant, thereby reducing the operation period, and quickly switching a machine type during the teaching.

The teleoperation section according to Example 4 of the present invention uses the section 6 for teaching task as the visual I/F, and includes a simplified sense feedback function, a refining function for teaching task using sensor information, an autonomous-control-law-design support function using sensor information history, and a hybrid cooperative teaching function of autonomous control/manual operations.

The simplified sense feedback function realizes a simplified sense feedback which returns a vibrator vibration or the like if a contact is detected according to sensor information during a jog operation.

The refining function for teaching task using sensor information records measured values of the force sensor and the image sensor during the teaching task carried out by the operator, and statistically processes operation history recorded for a plurality of times, thereby acquiring averages and eliminating error values, resulting in generation of a refined teaching path.

The autonomous-control-law-design support function using sensor information history provides a result obtained by statistically processing sensor information history acquired during an operation by the operator as a support function for designing autonomous control laws.

The hybrid cooperative teaching function of autonomous control/manual operations applies a designed autonomous control law only in a specific direction of movement, and enables manual operations for other directions of movement, thereby realizing a teaching support function.

As described above, according to Example 3 of the present invention, the section 6 for teaching task includes the visual I/F and the teleoperation function, can thus reduce the installation/adjustment period of a production system using industrial robots, can extend the no-error continuous operation period after the operation starts, can reduce the operation period further, and can quickly switch the machine type.

Example 5

An error recovery section cooperating with the action planning section 4 for temporary halts, the section 6 for teaching task, the error-recovery-task teaching section 12, and the error recovery library 10 may be provided, and an action control function, a function of enhancing the section for teaching task, and a teleoperation function may be added to the error recovery section as illustrated in FIGS. 25 to 27, which is not particularly mentioned in Example 1 (FIG. 1).

The checkpoint function for detecting error occurrence is embedded in an operation sequence of a robot output from the action planning section 4 for temporary halts in the action planning section 4 for temporary halts, and high productivity brought about by a long-term stable operation and a quick recovery upon a failure can thus be realized by enabling recovery action control from the detected error state by using the check point function.

Specifically, according to Example 5 of the present invention, an error state is recognized from various types of sensor information (robot position, time limit, joint torques, force sensor, and image sensor), and action control is carried out according to a degree of error seriousness. For an error for which an emergency stop is required, immediate stop is carried out by directly setting a limit value to the sensor output value.

An industrial robot system according to Example 5 of the present invention includes the error recovery section having the action control function (B1), the function of enhancing the section for teaching task (B2), and the teleoperation function (B3) for surely carrying out the above-mentioned operation.

The action control function (B1) of the error recovery section switches among the following three levels (M1) to (M3) of an error recovery operation mode according the degree of error seriousness, and assists a procedure for restart of production by synchronizing respective robots and respective production facilities with one another from an arbitrary stop position after recovery from an error state in each of the modes (M1) to (M3).

In the winding-back automatic recovery mode (M1), an automatic recovery is carried out from a present position at which an error is detected to an immediate previous checkpoint in a winding back manner.

In the operator recovery operation (teleoperation) mode (M2), an error stop signal is generated, thereby calling the operator, and the operator provides the error recovery operation by the teleoperation. If a recovery to a check point which is not adjacent to the present position is required, the system supports the recovery while synchronizing respective robots and production facilities with one another.

In the operator recovery operation (manual operation) mode (M3), an error stop signal is generated, thereby calling the operator, and the operator takes a step such as directly removing a workpiece which has caused the error from a task location. If a recovery to a check point which is not adjacent to the present position is required, the system supports the recovery while synchronizing respective robots and production facilities with one another.

The function of enhancing the section for teaching task (B2) of the error recovery section carries out an intuitive display of complex information obtained based on the force sensor and the camera image, and displays the force sensor information visualized on the finger eye camera image, thereby supporting an intuitive operation. Moreover, the function of enhancing the section for teaching task (B2) increases visibility of the finger eye camera image displayed on a display, and carries out digital zooming, edge-enhanced image generation, and contrast improvement.

The teleoperation function (B3) of the error recovery section uses the section 6 for teaching task as the visual I/F, thereby carrying out the simplified sense feedback. In other words, when a contact is detected according to sensor information during jog operation, the simplified sense feedback is realized by, for example, returning a vibrator vibration or the like.

Input/output information for the action control function of the error recovery section is illustrated in an explanatory diagram of FIG. 25.

Specifically, the input information includes the work sequence diagram and the degree of error seriousness, and the output information includes the error recovery operation mode.

Input/output information for the function of enhancing the section for teaching task of the error recovery section is illustrated in an explanatory diagram of FIG. 26.

Specifically, the input information includes the various types of sensor information (robot position, time limit, joint torque, force sensor output value, and image sensor output value), the work path, and an operated quantity by an operator, and the output information includes an image displaying combined information.

Input/output information for the teleoperation function of the error recovery section is illustrated in an explanatory diagram of FIG. 27.

Specifically, the input information is the operated quantity of the operator, and the output information is a simplified-sense-feedback-control operated quantity.

As described above, the industrial robot system according to Example 5 of the present invention includes the error recovery section cooperating with the action planning section 4 for temporary halts, the section 6 for teaching task, the error-recovery-task teaching section 12, and the error recovery library 10. The error recovery section includes the action control function, the function of enhancing the section for teaching task, and the teleoperation function, and thus it is possible to reduce the installation/adjustment period of a production system using the industrial robots and to extend the no-error continuous operation period after the operation starts. It is also possible to realize a stable operation for a long period and high productivity by quick recovery upon a failure.

Example 6

A recognition section cooperating with the section 6 for teaching task, the operation mastering section 7, the finger-eye-camera measurement section 32, and the three-dimensional recognition section 33 may be provided, and an object recognition function for part picking, a hybrid vision correction function, a vision function for error detection, and a recognition application building support function may be added to the recognition section as illustrated in FIGS. 28 to 31, which is not particularly mentioned in Example 1 described above.

Quick machine-type switching and high productivity are realized by providing the recognition section required for the teaching, the execution operation, and the error detection in Example 6 of the present invention.

It is assumed that the finger eye cameras and fixed camera on the environment side (including stereoscopic camera configuration) are provided for imaging, and a three-dimensional sensor such as a three-dimensional range finder is used according to necessity.

The recognition section according to Example 6 of the present invention includes an object recognition function for part picking (C1), a hybrid vision correction function (C2), a vision function for error detection (C3), and a recognition application building support function (C4).

The object recognition function for part picking (C1) of the recognition section constitutes a recognition function for picking an object from a part box by using the three-dimensional recognition section 33, and includes a function of checking interference upon the picking and a position correction function of a gripped object in the part gripping state.

The hybrid vision correction function (C2) of the recognition section realizes a two-dimensional/three-dimensional hybrid vision correction function by using the three-dimensional recognition section 33. Moreover, the hybrid vision correction function (C2) realizes a function of moving to a task point based on a three-dimensional position/attitude output acquired by using the three-dimensional recognition section 33 after receiving a relative positioning instruction in an image, and also realizes a semi-autonomous moving function along with a manual movement instruction by moving while maintaining constant relative attitude/relative distance with respect to a constraining surface.

The vision function for error detection (C3) of the recognition section uses an image recognition module which is generally available, such as a commercially available one, and uses an image acquired by the finger eye cameras, thereby providing a check function for a part shape. On this occasion, error detection is carried out based on a result of applying statistical processing based on a plurality of pieces of part shape data in the checking.

The recognition application building support function (C4) of the recognition section provides a function for supporting a user in easily building applications, such as model registration, parameter setting, calibration, and the like, when execution functions for a picking task, a visual correction task, and error detection using the respective functional configuration sections (C1) to (C3) are built.

Input/output information for the object recognition function for part picking (C1) (recognition module) of the recognition section is illustrated in an explanatory diagram of FIG. 28.

Specifically, the input information includes sensor output data, parameters, and model information, and the output information includes a recognition result for object picking from a part box, an interference check result, and a position correction value of a gripped object.

Input/output information for the hybrid vision correction function (C2) (correction module) of the recognition section is illustrated in an explanatory diagram of FIG. 29.

Specifically, the input information includes the sensor output data, a relative positioning instruction in a two-dimensional image, and three-dimensional position/attitude values, and the output information includes a movement trajectory to a task point, and a movement quantity.

Input/output information for the vision function for error detection (C3) (vision module) of the recognition section is illustrated in an explanatory diagram of FIG. 30.

Specifically, the input information includes an image acquired from the finger eye cameras and a plurality of pieces of part shape data, and the output information includes an error detection output.

Input/output information for the recognition application building support function (C4) (building support module) of the recognition section is illustrated in an explanatory diagram of FIG. 31.

Specifically, the input information includes the model information, the parameter information, and the calibration data.

Moreover, the output information includes recognition processing parameters, model data of an object to be recognized, and data representing a recognition processing sequence.

As described above, the industrial robot system according to Example 6 of the present invention includes the recognition section cooperating with the section 6 for teaching task, the operation mastering section 7, the finger-eye-camera measurement section 32, and the three-dimensional recognition section 33. The recognition section includes the object recognition function for part picking, the hybrid vision correction function, the vision function for error detection, and the recognition application building support function, and thus it is possible to reduce the installation/adjustment period of a production system using the industrial robots, and to extend the no-error continuous operation period after the operation starts. It is also possible to realize quick switching of the machine type and high productivity.

It is to be understood that the configurations of Examples 1 to 6 can be arbitrarily combined for application, and that this provides overlapping actions and effects.

Example 7

Further, in Example 1 described above (FIG. 1), the operation mastering section 7 and the various types of libraries 8 to 10 are provided, and also, the finger-eye-camera measurement section 32 and the three-dimensional recognition section 33 are provided in the robot system 3. However, those components may be omitted, and a configuration illustrated in FIG. 32 may be provided.

Figure 32:
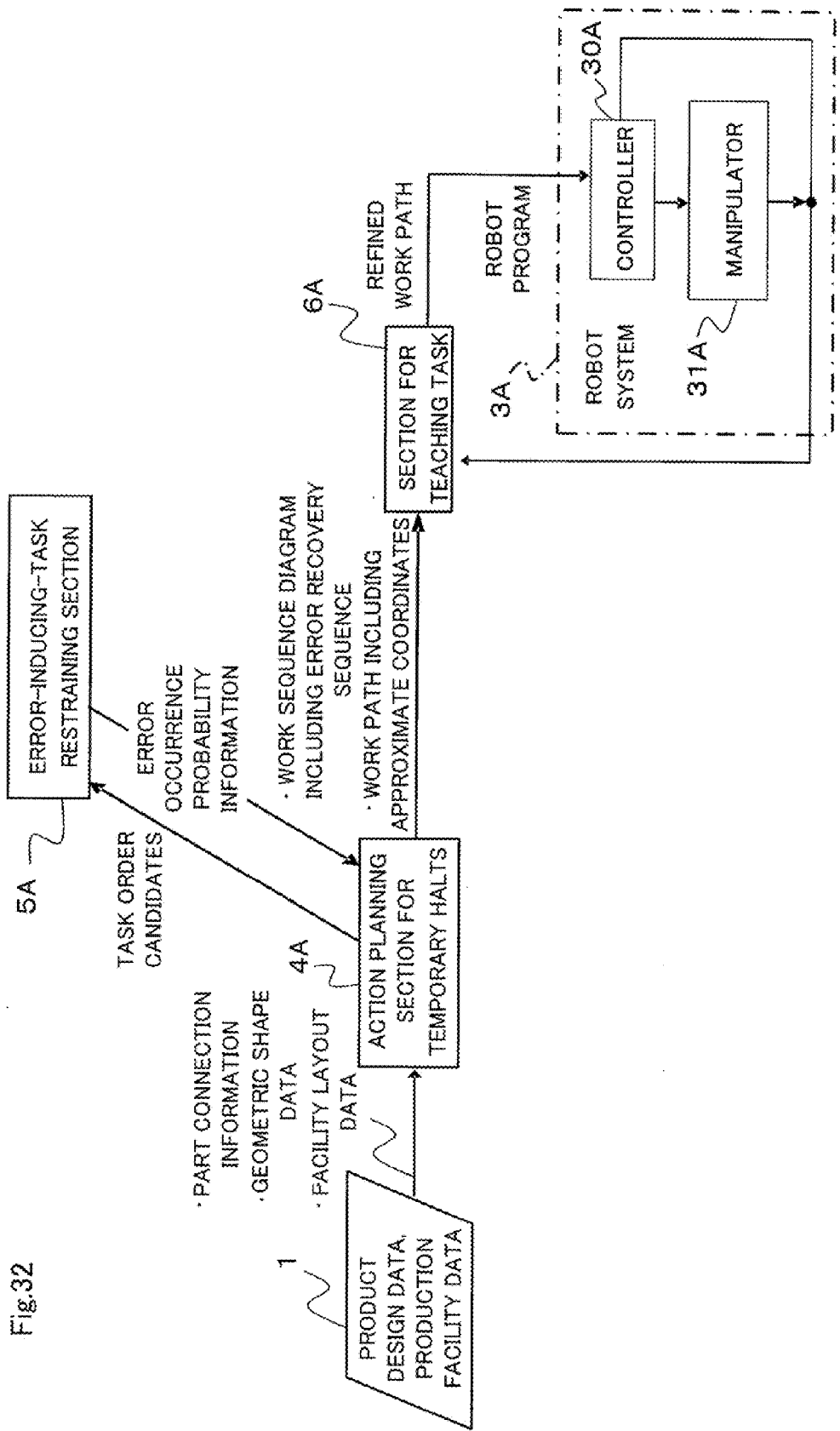
FIG. 32 A block configuration diagram of an industrial robot system according to Example 7 of the present invention (Example 7).

FIG. 32 is a block configuration diagram illustrating an industrial robot system according to Example 7 of the present invention. The like components are denoted by like numerals or by like numerals followed by "A" as for those described before (refer to FIG. 1).

Referring to FIG. 32, the industrial robot system includes the product design data and production facility data 1 (including part connection information, geometric shape data, and facility layout data) produced and prepared in advance by means of a three-dimensional CAD, and a robot system 3A installed on a production line.

Moreover, the industrial robot system includes an action planning section 4A for temporary halts, an error-inducing-task restraining section 5A, a section 6A for teaching task, a controller 30A, and a manipulator 31A as a configuration relating to the product design data and production facility data 1 and the robot system 3A. The controller 30A and the manipulator 31A are provided in the robot system 3A.

The action planning section 4A for temporary halts generates a work sequence diagram including error recovery sequences and a work paths including approximate coordinates based on the part connection information, the geometric shape data, and the facility layout data from the product design data and production facility data 1, and inputs the work sequence diagram and the work paths to the section 6A for teaching task.

Moreover, the action planning section 4A for temporary halts is mutually related to the error-inducing-task restraining section 5A, and inputs candidates of the task order to the error-inducing-task restraining section 5A and also receives the error occurrence probability information from the error-inducing-task restraining section 5A.

The section 6A for teaching task generates refined work paths (robot program before mastering) based on the work sequence diagram (including error recovery sequences) and the work paths (including approximate coordinates) from the action planning section 4A for temporary halts, and the operation monitoring information from the robot system 3A, and inputs the refined work paths to the controller 30A.

The controller 30A provides control for driving the manipulator 31A based on the robot programs and the operation monitoring information from the manipulator 31A.

A description is now given of an operation according to Example 7 of the present invention illustrated in FIG. 32.

As general design steps for a product by a designer, the structural design of a product to be manufactured, and the layout design for cells used to manufacture the product are first carried out as described before.

As a result, the part connection information representing a connection order of parts constituting the product (part configuration tree diagram), the product design data such as the geometric shape data of the parts, the facility layout data within the cells, and the production facility data such as specifications of the robots are obtained.

The system operation according to Example 7 of the present invention starts from a state in which those results of the design task by a designer are available.

A description is now given of the system operation according to Example 7 of the present invention when the production facility starts.

The product design data and production facility data 1 are input to the action planning section 4A for temporary halts in a first phase.

As a result, a product production task is decomposed into a sequence of smaller tasks, and each of these tasks are assigned to each of the facilities in the cell, and a task order is generated based on the part connection information in the action planning section 4A for temporary halts. On this occasion, when the task is decomposed and the task order is determined, if a candidate of the task order is given to the error-inducing-task restraining section 5A, the error occurrence probability information for the given task is returned, and a task order having a low risk of temporary halt is thus selected. Note that, the error occurrence probability is updated at any time by the operation monitoring information while production is being carried out.

Moreover, the action planning section 4A for temporary halts determines the respective tasks and the task order, and generates a "work sequence diagram including error recovery sequences" including check points for examining an occurrence of a temporary halt during the task, a recovery point at which the task can be resumed when a check point is not passed, a recovery path for returning to the recovery points, a via point for avoiding an obstacle, work paths connecting between the respective points to each other, and a sequence describing the execution order of the respective paths, and a synchronization point at which other robots and devices are caused to wait.

Moreover, an attribute label is attached to each of the work paths.

Specifically, the labels include "movement between two points", "movement to via pint", "task accompanying action by end effector device", "task according to sensor feedback control such as approaching movement immediately before/after gripping part or task operation optimized in advance", and "during recovery sequence from temporary halt". Note that, a plurality of labels may be attached to one work path.

On this stage, the work sequence diagram includes only the labeled work paths and the respective points, and does not include contents of each of the work paths.

Note that, the content of the work path includes position and attitude coordinates at both ends of the path and via points thereof (a plurality of via points are added according to necessity) and a specification of method of movement between the coordinates (such as control law and interpolation method).

Moreover, the task operation optimized in advance includes tips for preventing task errors, and quickly and flexibly carrying out the task.

As a next phase, rough contents of the work paths for each of the tasks are generated by using facility layout data within the cells and task order data in the action planning section 4A for temporary halts.

For example, if there are a part placement location and a work bench in a production cell, and a work path of a specific trajectory for transporting a part is considered for a task for transporting a part from the part placement location to the work bench, a robot may interfere with surrounding objects, and it is eventually necessary to set precise values to instances of each of the work paths.

Each of the work paths is generated at a precision of approximately 5 cm on this occasion, and a reference attitude for gripping an object (relative attitude between the part and the hand) is determined in the section 6A for teaching task on a later stage by an operator using teaching task input means.

The above-mentioned operation is repeated for all the work paths, and data including "work sequence diagram including error recovery sequences+work paths including approximate coordinates" is obtained as the output information from the action planning section 4A for temporary halts up to this phase.

The section 6A for teaching task then starts an operation.

Refined work paths to which absolute coordinates are specified are determined by a teaching operator using teaching task input means by carrying out only final positioning of important operation points such as gripping points for the work paths including approximate coordinates in the section 6A for teaching task.

A user interface based on the ecological interface theory displayed on a personal computer for the teaching task or a teaching pendant presents important operation points and task states on this occasion, and the operator carries out the refining task for the position/attitude, and adds work paths according to necessity on the teaching task input means while observing the presented states.

As described above, the action planning section 4A for temporary halts, the error-inducing-task restraining section 5A, and the section 6A for teaching task in cooperation with the respective pieces of design data 1 generate a robot program for the robot system 3A.

That is, also in the configuration of Example 7 (FIG. 32) of the present invention, a robot program executable on the controller 30A including recovery sequences for the case of occurrence of a temporary halt can be obtained from the product design data and production facility data 1 while the load on the teaching operator is reduced significantly compared with a conventional case.

REFERENCE SIGNS LIST

1: product design data and production facility data, 2: specific task specification, 3, 3A: robot system, 4, 4A: action planning section for temporary halts, 5, 5A: error-inducingtask restraining section, 6, 6A: section for teaching task, 7: operation mastering section, 8: hand library, 9: specific task library, 10: error recovery library, 11: optimum-task-operation generating section, 12: error-recovery-task teaching section, 30, 30A: controller, 31, 31A: manipulator, 32: finger-eye-camera measurement section, 33 three-dimensional recognition section, 34: manipulation device group, 34a: universal hand, 34b: robot hand, 32a: high speed camera, 32b: omnidirectional mirror, 40: object to be measured, 41: three-dimensional sensor, 50: network, 51: mashup section, W: part to be assembled

The invention claimed is:

1. An industrial robot system including a robot having a manipulator and a hand with a plurality of fingers, and used for a production system for assembling a product which is an object to be manufactured, comprising:
   action planning circuitry for temporary halts to generate task information and a first work path in order to address a temporary halt that constitutes an obstacle to a teaching task when a production line is started up and adjusted, the first work path defining approximated and unrefined robot movements from a start point to an end point;
   error-inducing-task restraining circuitry to generate error information used for restraining a task inducing an error based on the task information;
   task-teaching circuitry to generate a second work path specifying absolute coordinates based on the first work path, the error information, and an input from an operator, the second work path defining specific and refined robot movements from the start point to the end point;
   operation mastering circuitry to generate a third work path optimized for the robot based on the second work path, the third work path defining optimized robot movements from the start point to the end point;
   a memory that stores a hand library formed by associating an assembly task of the robot and control software with each other;
   optimum-task-operation circuitry to generate an operation sequence of specific tasks;
   the memory stores a specific task library for storing the operation sequence of specific tasks;
   error-recovery-task teaching circuitry to teach an error recovery task according to an error state based on an operation history in the task-teaching circuitry;
   the memory stores an error recovery library for storing the error recovery task;
   finger-eye-camera measurement circuitry and three-dimensional recognition circuitry to generate operation monitoring information on the robot, and to input the operation monitoring information to the error-inducing-task restraining circuitry, the task-teaching circuitry, and the operation mastering circuitry, the finger-eye-camera measurement circuitry including a different finger camera provided close to the fingertip of each finger of the hand and an omnidirectional mirror that is opposite to each finger and finger camera so at least one of the finger cameras can capture a reflected image of the fingertip and a periphery of the fingertip as a partial basis for the operation monitoring information on the robot; and
   a controller to control the robot based on the second work path and the third work path, and on the operation monitoring information, wherein:
   the action planning circuitry generates the first work path based on configuration information on the production system and the object to be manufactured including at least part connection information, geometric shape data, and facility layout data, information stored in the hand library, the specific task library, the error recovery library, and the error information from the error-inducing-task restraining circuitry;
   the task information includes at least a check point for examining a temporary halt during the task, a recovery point returning to which enables the task to resume when the check point is not passed, a recovery path for returning to the recovery point, work paths connecting the respective points to each other, and a sequence describing the execution sequence of each of the work paths, and a synchronization point;
   the task-teaching circuitry, based on the input by the operator, warns the operator about a task operation that is likely to cause a mistake when the second work path is being generated;
   the error-recovery-task teaching circuitry calculates error recovery information on components including the robot based on a cause for occurrence of the error and the operation history from the task-teaching circuitry; and
   the action planning circuitry for temporary halts, the task-teaching circuitry, and the operation mastering circuitry generate program information including the third work path required for teaching the robot from the configuration information on the production system and the object to be manufactured.

2. An industrial robot system according to claim 1, further comprising:
   mashup circuitry to provide cooperation among the action planning circuitry for temporary halts, the error-inducing-task restraining circuitry, the task-teaching circuitry, the operation mastering circuitry, the hand library, the optimum-task-operation generating circuitry, the specific task library, the error-recovery-task teaching circuitry, the error recovery library, and the controller.

3. An industrial robot system according to claim 1, further comprising:
   offline teaching circuitry having an error detection function,
   wherein the offline teaching circuitry has functions of the error-inducing-task restraining circuitry and the hand library.

4. An industrial robot system according to claim 1, wherein the task-teaching circuitry has a visual interface and a teleoperation function.

5. An industrial robot system according to claim 1, further comprising:
   error recovery circuitry that cooperates with the action planning circuitry for temporary halts, the task-teaching circuitry, the error-recovery-task teaching circuitry, and the error recovery library,
   wherein the error recovery circuitry has an action control function, a function of enhancing the task-teaching circuitry, and a teleoperation function.

6. An industrial robot system according to claim 1, further comprising:
   recognition circuitry that cooperates with the task-teaching circuitry, the operation mastering circuitry, the finger-eye-camera measurement circuitry, and the three-dimensional recognition circuitry,
   wherein the recognition circuitry has an object recognition function for part picking, a hybrid vision correction function, a vision function for error detection, and a recognition application building support function.

7. An industrial robot system according to claim 1, further comprising:
- a fingertip force sensor provided close to the fingertip of each finger of the hand that measures a force and torque applied to the fingertip; and
- the task-teaching circuitry further warns the operator about the task operations that is likely to cause the mistake when the second work path is being generated by displaying the reflected image captured by at least one of the finger cameras and displaying information obtained by matching data acquired by the fingertip force sensor against a model prepared in advance and obtained by abstracting a phenomenon occurring on the robot fingertip.

8. An industrial robot system including a robot having a manipulator and a hand with a plurality of fingers, and used for a production system for assembling a product which is an object to be manufactured, comprising:
- action planning circuitry for temporary halts to generate task information and a first work path in order to address a temporary halt that constitutes an obstacle to a teaching task when a production line is started up and adjusted, the first work path defining approximated and unrefined robot movements from a start point to an end point;
- error-inducing-task restraining circuitry to generate error information used to restrain a task inducing an error based on the task information;
- task-teaching circuitry to generate a second work path specifying absolute coordinates based on the first work path, the error information, and an input from an operator, the second work path defining specific and refined robot movements from the start point to the end point;
- finger-eye-camera measurement circuitry and three-dimensional recognition circuitry to generate operation monitoring information on the robot, and to input the operation monitoring information to the error-inducing-task restraining circuitry and the task-teaching circuitry, the finger-eye-camera measurement circuitry including a different finger camera provided close to the fingertip of each finger of the hand and an omnidirectional mirror that is opposite to each finger and finger camera so at least one of the finger cameras can capture a reflected image of the fingertip and a periphery of the fingertip as a partial basis for the operation monitoring information on the robot; and
- a controller for controlling the robot based on the second work path and the operation monitoring information, wherein:
- the action planning circuitry generates the first work path based on configuration information on the production system and the object to be manufactured including at least part connection information, geometric shape data, and facility layout data, and the error information from the error-inducing-task restraining section;
- the task information includes at least a check point for examining a temporary halt during the task, a recovery point returning to which enables the task to resume when the check point is not passed, a recovery path for returning to the recovery point, work paths connecting the respective points to each other, and a sequence describing the execution sequence of each of the work paths, and a synchronization point;
- the task-teaching circuitry, based on the input by the operator, warns the operator about a task operation that is likely to cause a mistake when the second work path is being generated; and
- the action planning circuitry and the task-teaching circuitry generate program information including the second work path required for teaching the robot from the configuration information on the production system and the object to be manufactured.

9. An industrial robot system according to claim 8, further comprising:
- a fingertip force sensor provided close to the fingertip of each finger of the hand that measures a force and torque applied to the fingertip; and
- the task-teaching circuitry further warns the operator about the task operations that is likely to cause the mistake when the second work path is being generated by displaying the reflected image captured by at least one of the finger cameras and displaying information obtained by matching data acquired by the fingertip force sensor against a model prepared in advance and obtained by abstracting a phenomenon occurring on the robot fingertip.

* * * * *